United States Patent
Faris et al.

(10) Patent No.: US 6,403,244 B2
(45) Date of Patent: *Jun. 11, 2002

(54) METAL-AIR FUEL CELL BATTERY SYSTEM EMPLOYING HYDROSTATIC FORCES TO ENABLE SIMULTANEOUS TRANSPORT OF METAL-FUEL TAPE, MOVABLE CATHODE STRUCTURE, AND IONICALLY-CONDUCTIVE MEDIUM THERETHROUGH DURING SYSTEM OPERATION

(75) Inventors: Sadeg M. Faris, Pleasantville; Tsepin Tsai, Peekskill; Thomas J. Legbandt, Brooklyn, all of NY (US); Wayne Yao, Bergenfield, NJ (US); Muguo Chen, West Harrison, NY (US)

(73) Assignee: Reveo, Inc., Elmsford, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/133,166

(22) Filed: Aug. 12, 1998

Related U.S. Application Data

(63) Continuation of application No. 09/110,761, filed on Jul. 3, 1998, now Pat. No. 6,335,111, which is a continuation-in-part of application No. 09/074,337, filed on May 7, 1998, which is a continuation-in-part of application No. 08/944,507, filed on Oct. 6, 1997, now Pat. No. 6,296,960.

(51) Int. Cl.[7] .................... H01M 12/06; H01M 2/36; H01M 4/86
(52) U.S. Cl. .............. 429/27; 429/63; 429/68; 429/69; 429/80; 429/127
(58) Field of Search .............. 429/27, 63, 68, 429/69, 80, 127

(56) References Cited

U.S. PATENT DOCUMENTS 3,252,838 A 5/1966 Huber et al.

(List continued on next page.)

FOREIGN PATENT DOCUMENTS

GB 1176488 1/1970 .......... H01M/29/02

OTHER PUBLICATIONS

Fabrication of Thin–Film LIMN2O4 Cathodes for Rechargeable Microbateries by F.K. Shokoohi, et. al., Applied Physics Letters, Sep. 1991, p. 1260–1262.

(List continued on next page.)

Primary Examiner—Stephen Kalafut
(74) Attorney, Agent, or Firm—Thomas J. Perkowski, PC; Ralph J. Crispino; Kilpatrick& Stockton LLP

(57) ABSTRACT

In an air-metal fuel cell battery (FCB) system, wherein a movable cathode structure is mounted within a housing through which metal-fuel tape is transported along a predetermined path while an ionically-conductive medium is disposed between the metal-fuel tape and the movable cathode structure. In illustrative embodiments, the movable cathode structure is realized as a rotatable cathode cylinder, and a transportable cathode belt. The ionically-conductive medium is realized as a solid-state ionically-conductive film applied to the cathode structures and/or metal-fuel tape, as well as ionically-conductive belt structures. During system operation, the metal-fuel tape and/or the ionically-conductive medium are wetted in order create sufficient surface tension, and thus sufficient hydrostatic forces, between the metal-fuel tape and ionically-conductive medium and between the ionically-conductive medium and the movable cathode structure, to enable the movable cathode structure, ionically-conductive medium and metal-fuel tape to move at substantially the same velocity at points of contact therebetween while only one or these three moving system components are being actively driven by a transport mechanism. By virtue of the present invention, it is possible to transport the moving components of the FCB system using a various types of low power devices including, for example, miniature electrical and spring-driven motors, while substantially reducing the likelihood of damage thereto during system operation.

25 Claims, 13 Drawing Sheets

U.S. PATENT DOCUMENTS

| | | | |
|---|---|---|---|
| 3,260,620 A | * | 7/1966 | Gruber ........................ 429/127 |
| 3,357,864 A | | 12/1967 | Huber |
| 3,432,354 A | * | 3/1969 | Jose ............................ 429/68 |
| 3,436,270 A | | 4/1969 | Oswin et al. |
| 3,454,429 A | * | 7/1969 | Gruber ................... 429/127 X |
| 3,532,548 A | | 10/1970 | Stachurski |
| 3,536,535 A | | 10/1970 | Lippincott |
| 3,577,281 A | | 5/1971 | Pountney et al. |
| 3,663,298 A | | 5/1972 | McCoy et al. |
| 3,717,505 A | | 2/1973 | Unkle, Jr. et al. |
| 3,822,149 A | | 7/1974 | Hale |
| 3,928,072 A | | 12/1975 | Gerbler et al. |
| 3,963,519 A | | 6/1976 | Louie |
| 3,977,901 A | | 8/1976 | Buzzelli |
| 4,052,541 A | | 10/1977 | Krusenstierna |
| 4,152,489 A | | 5/1979 | Chottiner |
| 4,172,924 A | | 10/1979 | Warszawski |
| 4,246,324 A | | 1/1981 | Nora et al. |
| 4,331,742 A | | 5/1982 | Lovelace et al. |
| 4,341,847 A | | 7/1982 | Sammells |
| 4,551,399 A | | 11/1985 | Despic |
| 4,560,626 A | | 12/1985 | Joy |
| 4,626,482 A | | 12/1986 | Hamlen et al. |
| 4,693,946 A | | 9/1987 | Niksa et al. |
| 4,714,662 A | | 12/1987 | Bennett |
| 4,828,939 A | | 5/1989 | Turley et al. |
| 4,913,983 A | | 4/1990 | Cheiky |
| 4,916,036 A | * | 4/1990 | Chelky ........................ 429/127 |
| 4,950,561 A | | 8/1990 | Niksa et al. |
| 4,957,826 A | | 9/1990 | Cheiky |
| 4,968,396 A | | 11/1990 | Harvey |
| 5,250,370 A | * | 10/1993 | Faris ............................ 429/68 |
| 5,260,144 A | | 11/1993 | O'Callaghan |
| 5,306,579 A | | 4/1994 | Shepard, Jr. et al. |
| 5,318,861 A | | 6/1994 | Harats et al. |
| 5,328,777 A | | 7/1994 | Bentz et al. |
| 5,328,778 A | | 7/1994 | Woodruff |
| 5,354,625 A | | 10/1994 | Bentz et al. |
| 5,362,577 A | | 11/1994 | Pedicini |
| 5,387,477 A | | 2/1995 | Cheiky |
| 5,389,456 A | | 2/1995 | Singh et al. |
| 5,405,713 A | | 4/1995 | Pecherer et al. |
| 5,418,080 A | | 5/1995 | Korall et al. |
| 5,439,758 A | | 8/1995 | Stone et al. |
| 5,462,816 A | | 10/1995 | Okamura et al. |
| 5,486,429 A | | 1/1996 | Thibault |
| 5,512,384 A | * | 4/1996 | Celeste et al. .......... 429/127 X |
| 5,525,441 A | | 6/1996 | Reddy et al. |
| 5,536,592 A | | 7/1996 | Celeste et al. |
| 5,554,452 A | | 9/1996 | Delmolino et al. |
| 5,582,931 A | | 12/1996 | Kawahami |
| 5,599,637 A | | 2/1997 | Pecherer et al. |
| 5,691,074 A | | 11/1997 | Pedicini |
| 5,711,648 A | | 1/1998 | Hammerslag |
| 5,721,064 A | | 2/1998 | Pedicini et al. |
| 5,756,228 A | | 5/1998 | Roseanou |

OTHER PUBLICATIONS

Battery Chargers by Mike Allen, Popular Mechanics, Sep. 1991, p. 30–31.

New Age EVs by Herb Schuldner, Popular Mechanics, Sep. 1991, p. 27–29.

Marketing Study for AER Energy Resources, Inc. by Authors not indicated, AER Energy Resources, Inc., 1991, p. 6–28 (Month unknown).

Electric Car Showdown in Phoenix by Rick Cook, Popular Science, Jul. 1991, p. 64–65,82.

Batteries for Cordless Appliances by Ralph J. Brodd, Ch. 3 of Batteries for Cordless Appliances, 1987, p. 49–59 (Month unknown).

PCT/US98/21257 Search Report, Apr. 12, 1999.

PCT/US98/21260 Search Report, Feb. 8, 1999.

PCT/US98/21256 105–041PCT000 International Search Report, Feb. 17, 1999.

* cited by examiner

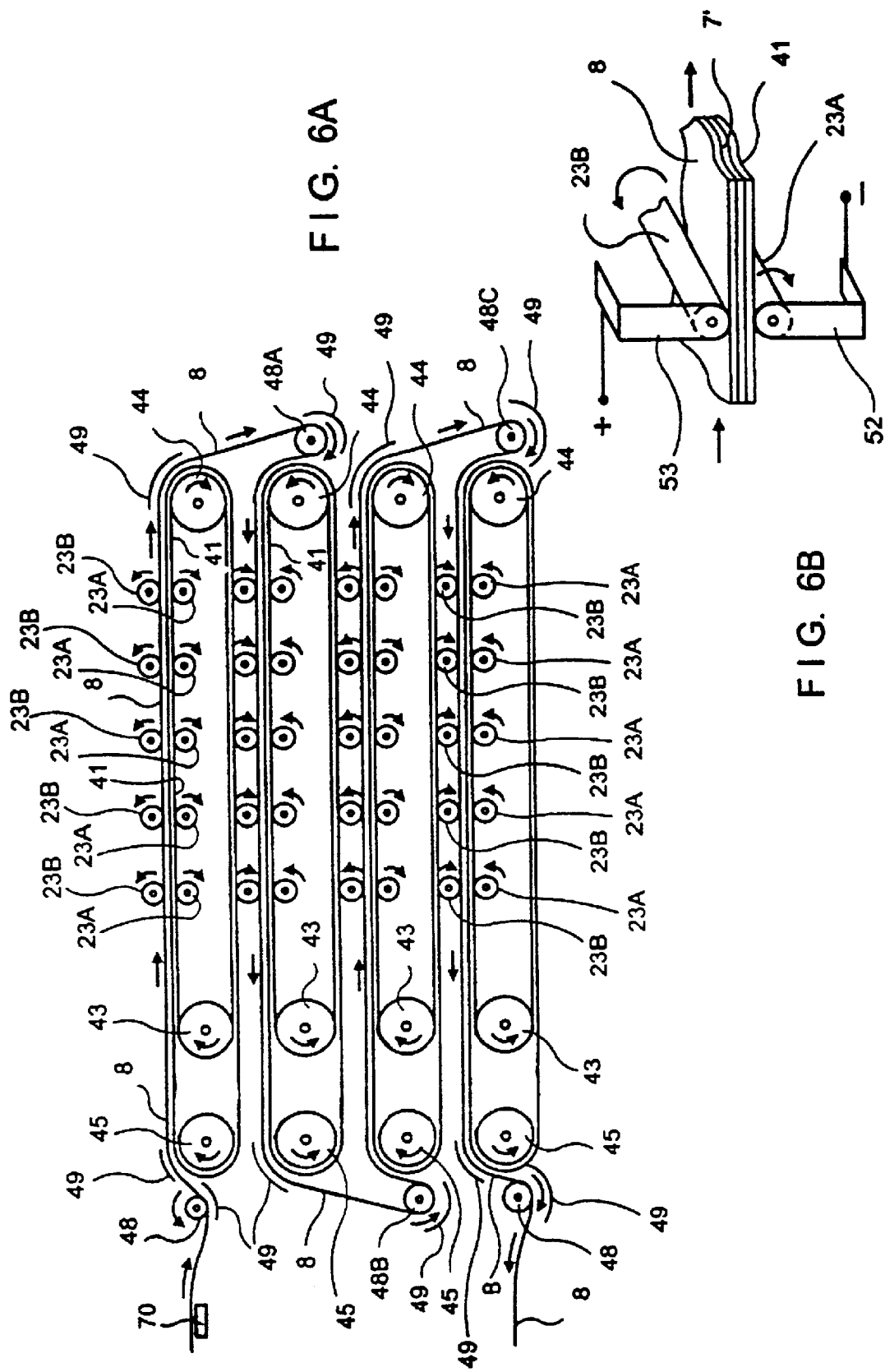

METAL-AIR FUEL CELL BATTERY SYSTEM EMPLOYING HYDROSTATIC FORCES TO ENABLE SIMULTANEOUS TRANSPORT OF METAL-FUEL TAPE, MOVABLE CATHODE STRUCTURE, AND IONICALLY-CONDUCTIVE MEDIUM THERETHROUGH DURING SYSTEM OPERATION

This is a Continuation of application Ser. No. 09/110,761 entitled "Metal-Air Fuel Cell Battery System Employing A Plurality Of Moving Cathode Structures For Improved Volumetric Power Density" filed Jul. 3, 1998, now U.S. Pat. No. 6,335,111, which is a Continuation-in-Part of application Ser. No. 09/074,337 entitled "Metal-Air Fuel-Cell Battery Systems" filed May 7, 1998; and application Ser. No. 08/944,507 entitled "High-Power Density Metal-Air Fuel Cell Battery System" by Sadeg Faris, et al. filed Oct. 6, 1997, now U.S. Pat. No. 6,296,960, said application being assigned to Reveo, Inc. and incorporated herein by reference in its entirely.

BACKGROUND OF INVENTION

1. Field of Invention

The present invention relates to metal-air fuel cell battery (FCB) systems designed to produce electrical power from metal-fuel tape transported over a plurality of moving cathode structures in order to increase the volumetric power density characteristics of the system.

2. Brief Description of the Prior Art

In U.S. Pat. No. 6,296,960 entitled "High-Power Density Metal-Air Fuel Cell Battery System", Applicants disclose several types of novel metal-air fuel cell battery (FCB) systems. During power generation, metal-fuel tape is transported over a stationary cathode structure in the presence of an ionically-conductive medium, such as an electrolyte-impregnated gel applied to the surface of the cathode or metal-fuel tape. In accordance with well known principles of electro-chemistry, the transported metal-fuel tape is oxidized as electrical power is produced from the system.

FCB power generation systems of the type disclosed in U.S. Pat. No. 5,296,960 have numerous advantages over prior art electro-chemical power generation devices including, for example, the generation of electrical power over a range of output voltage levels selectable to particular electrical load conditions. Also, oxidized metal-fuel tape can be reconditioned (i.e. recharged) during battery charging cycles carried out during electrical power generation, as well as separately therefrom.

However, when using such prior art technology it has. been very difficult to produce FCB systems having high volumetric power density characteristics measured, for example, in kilowatts/cm$^3$. Consequently, it has not been possible to generate large amounts of electrical power from prior art FCB systems occupying relatively small volumes of physical space.

Thus, there is a great need in the art for an improved metal-air fuel cell battery system which avoids the shortcomings and drawbacks of prior art systems and methodologies.

OBJECTS AND SUMMARY OF THE INVENTION

Accordingly, it is a primary object of the present invention to provide an improved metal-air fuel cell battery (FCB) system which avoids the shortcomings and drawbacks of prior art systems and methodologies.

Another object of the present invention is to provide a FCB system having improved volumetric power density (VPD) characteristics while avoiding the shortcomings and drawbacks of prior art systems and methodologies.

Another object of the present invention, is to provide such a FCB system, wherein metal-fuel tape is transported over a plurality of moving cathode structures during system operation.

Another object of the present invention, is to provide such a FCB system, wherein the metal-fuel tape, ionically-conducting medium and cathode structures are moved at substantially the same velocity at points where the ionically-conducting medium contacts the cathode structures and the metal-fuel tape during discharging and recharging operations, thereby minimizing, the generation of frictional (e.g. shear) forces among the cathode structures, ionically-conducting medium and metal-fuel tape in the system, and thus reduce the amount of electrical power required to drive the tape transport mechanism, the shedding of metal-oxide particles from metal-fuel tape which can become embedded within the cathode structures, and the likelihood of damage or destruction of the cathode structures and metal-fuel tape.

Another object of the present invention is to provide such a system, wherein velocity synchronization of the metal-fuel tape, cathode structures and ionically-conductive medium is realizable in a variety of ways.

Another object of the present invention is to provide such a system, wherein each moving cathode structure is realized as a cylindrically-shaped rotational structure having ultra-fine perforations formed in the surface thereof and a hollow air-flow passageway extending from one end thereof to the other end thereof in order to permit oxygen transport to the interface between the ionically-conducting medium and metal-fuel tape during system operation.

Another object of the present invention is to provide such a system, wherein each rotating cylindrical cathode comprises a plastic hollow cylinder about which is attached is a cathode element made from nickel mesh sponge fabric embedded within carbon and catalyst material.

Another object of the present invention is to provide such a system, wherein during power generation operations, each cylindrical cathode structure is rotated at a controlled angular velocity, and a continuous supply of metal-fuel tape is transported over the surface of the rotating cathode cylinders at a velocity, at which the metal-fuel tape, ionically-conducting medium and cathode cylinders move at substantially the same velocity at the points (i.e. locus) of contact thereamong in the system.

Another object of the present invention is to provide such a system, wherein the ionically-conducting medium is realized in the form of an ionically-conducting belt that runs over each rotating cathode cylinder in the system, between the cathode surface and metal-fuel tape transported thereover.

Another object of the present invention is to provide such a system, wherein the ionically-conducting belt is made from an open-cell plastic material impregnated with ionically-conducting material capable of supporting ionic transport between the moving cathode and anode (metal-fuel) structures in the system.

Another object of the present invention is to provide such a system, wherein the ionically-conducting medium is realized in the form of a solid-state-film applied to the outer surface of each rotating cathode cylinder, and the metal-fuel tape is realized in the form of zinc-fuel tape realized as a thin strip of zinc, or zinc power mixed with an binder and carried on a polyester substrate, or zinc powder impregnated within a substrate.

Another object of the present invention is to provide such a system, wherein each cathode structure is realized as a rotating cathode cylinder having ultrafine perforations formed in the surface thereof and a hollow central core which enables the transport of oxygen to the interface between the ionically-conductive medium and metal-fuel tape.

Another object of the present invention is to provide such a system, wherein each cylindrical cathode comprises a plastic hollow cylinder about which is attached is a cathode element made from nickel mesh fabric (for current collection) embedded within carbon, catalytic and binder material.

Another object of the present invention is to provide such a system, wherein each cylindrical cathode is rotated at a controlled angular velocity and the metal-fuel tape is transported over the surface of the rotating cathode so that both the metal-fuel tape and the cathode structure move at substantially the same velocity at the locus of points at which the ionically-conducing medium contacts both the metal-fuel, tape and the cathode structure.

Another object of the present invention is to provide such a system, wherein the ionically-conductive medium is realized in the form of an ionically-conductive belt, transported (i.e. running) between two or more transport cylinders.

Another object of the present invention is to provide such a system, wherein the ionically-conductive belt is fabricated from an open-cell plastic material impregnated with an ionically-conductive material which enables ionic transport between the moving cathode and anode structures in the system.

Another object of the present invention is to provide such a system, wherein velocity control can be achieved in a variety of ways, for example: by driving each cylindrical cathode with the gears of a neighboring cathode cylinder; by driving each cylindrical cathode structure with a belt that is also used to transport the metal-fuel tape (i.e. between supply and take-up reels or hubs within a cassette type-device); by driving each cylindrical cathode structure and supply and take-up hubs of a fuel cassette device using a set of synchronously controlled motors.

Another object of the present invention is to provide such a system, wherein the ionically-conductive medium is realized as a solid-state film applied on the outer surface of the cylindrical cathode structure, and the metal-fuel tape is realized in the form of thin zinc tape, zinc power mixed with an binder and carried on a polyester substrate, or zinc powder impregnated within the substrate of the tape itself.

Another object of the present invention is to provide a metal-air fuel cell battery system, wherein each rotatable cathode structure is realized as a cathode belt structure having ultrafine perforations in the surface thereof and a hollow central core for enabling oxygen transport to the interface between the ionically-conductive medium and the metal-fuel tape.

Another object of the present invention is to provide such a system, wherein each cathode belt structure comprises an open-cell type plastic substrate, within which nickel mesh fabric or like material is embedded within carbon and catalytic material.

Another object of the present invention is to provide such a system, wherein during system operation, each cathode belt structure is transported at a controlled velocity between two or more transport cylinders, while metal-fuel tape is transported over the surface of the cathode belt structure at substantially the same velocity at the locus of points at which the ionically-conducing medium contacts both the metal-fuel tape and the cathode structure.

Another object of the present invention is to provide such a system, wherein the ionically-conductive medium of the system is realized in the form of an ionically-conductive belt structure transported between metal-fuel tape and each cathode belt structure at substantially the same velocity as the cathode belt structure and metal-fuel tape at the locus of points at which the ionically-conductive medium contacts both the metal-fuel tape and the cathode belt structure.

Another object of the present invention is to provide such a system, wherein the ionically-conductive medium of the system is realized in the form of a solid-state film integrated with the outer surface of the cathode belt structure so as to establish contact with the anodic metal-fuel tape transported thereover.

Another object of the present invention is to provide such a system, wherein the metal-fuel tape is realized in the form of thin zinc tape, zinc power mixed with a binder and carried on a polyester substrate, or zinc powder impregnated within the substrate itself.

Another object of the present invention is to provide a system, wherein the metal-fuel tape, cathode structures and ionically-conductive medium are moved relative to each other so that frictional (e.g. shear) forces generated among the metal-fuel tape ionically-conductive medium and cathode structures are substantially reduced.

Another object of the present invention is to provide a metal-air FCB system, wherein a condition of hydrostatic drag is maintained between the metal-fuel tape and the ionically-conductive medium (e.g. belt or layer) as well as between the cathode structure (e.g. cylinder or belt) and the ionically-conductive medium (i.e. belt or layer) so that all three of these moving system components can. be moved at substantially the same velocity (at points where, the ionically-conductive medium contacts the metal-fuel tape and the cathode structure) when only one or more of these moving system components are actively transported or rotated using a motor driven by mechanical (e.g. spring-wound), electrical, or pneumatic forces.

These and other Objects Of The Present Invention will become apparent hereinafter and in the Claims To Invention.

BRIEF DESCRIPTION OF THE DRAWINGS

For a more complete understanding of the Objects of the Present Invention, the following detailed Description of the Illustrative Embodiments Of the Present Invention should be read in conjunction with the accompanying Drawings, wherein:

FIG. 6A is an elevated side view of the FCB system shown in FIG. 6;

FIG. 6B is an partially cut-away perspective view of one pair of cathode and anode contacting structures employed in the system of FIG. 6, shown contacting the cathode belt structure and metal-fuel tape with ionically-conductive medium disposed therebetween;

DETAILED DESCRIPTION OF THE ILLUSTRATIVE EMBODIMENTS OF THE PRESENT INVENTION

The present invention provides a novel way of improving the volumetric power density (VPD) characteristics of FCB systems by using a plurality of moving cathode structures closely arranged together for transporting mental-fuel tape and ionically-conducting medium at substantially the same velocity as the cathode structures at the locus of points at which the ionically-conductive medium contacts the cathode structures and the metal-fuel tape. The objective to be achieved by this condition of operation is to improve the volumetric power density characteristics of the FCB system, while minimizing the generation of frictional (e.g. shear) forces among the metal-fuel tape, ionically-conducting medium and cathode structures and thus reduce the amount of electrical power required to transport the likelihood of damaging the cathode structures and metal-fuel tape used in the FCB system.

First Illustrative Embodiment Of The FCB System

Figure 1A:
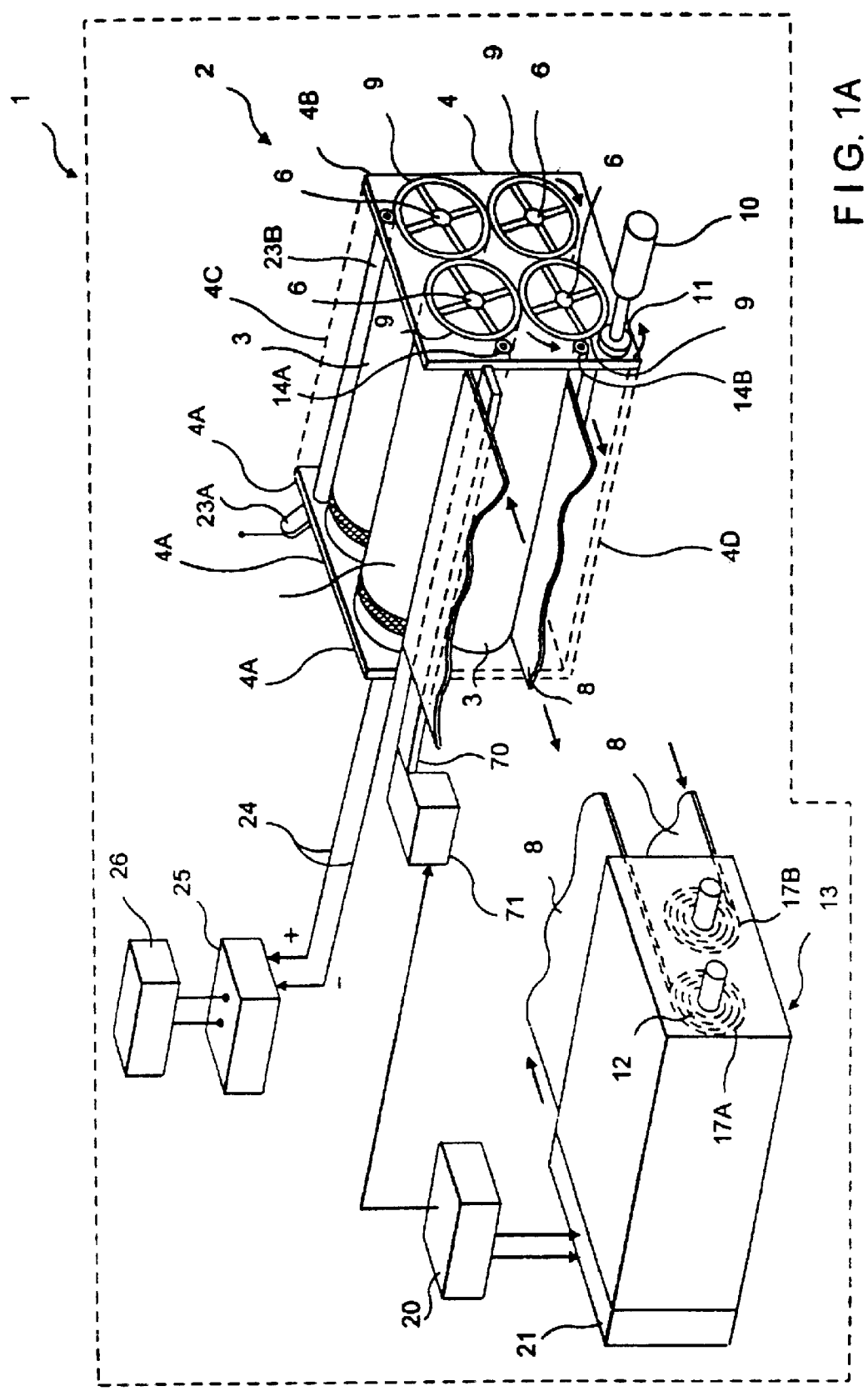
FIG. 1A is a schematic representation of a first illustrative embodiment of the metal-air fuel-cell battery (FCB) system of the present invention, wherein a plurality of cathode cylinders are rotatably mounted within a compact support fixture (i.e. housing), and metal-fuel tape stored within a cassette-type cartridge is transported over the surface of the rotatably mounted cathode cylinders with an ionically-conductive medium disposed between the metal-fuel tape and cathode cylinders at the locus of points at which the ionically-conductive medium contacts each cathode cylinder and metal-fuel tape.
Figure 1B:
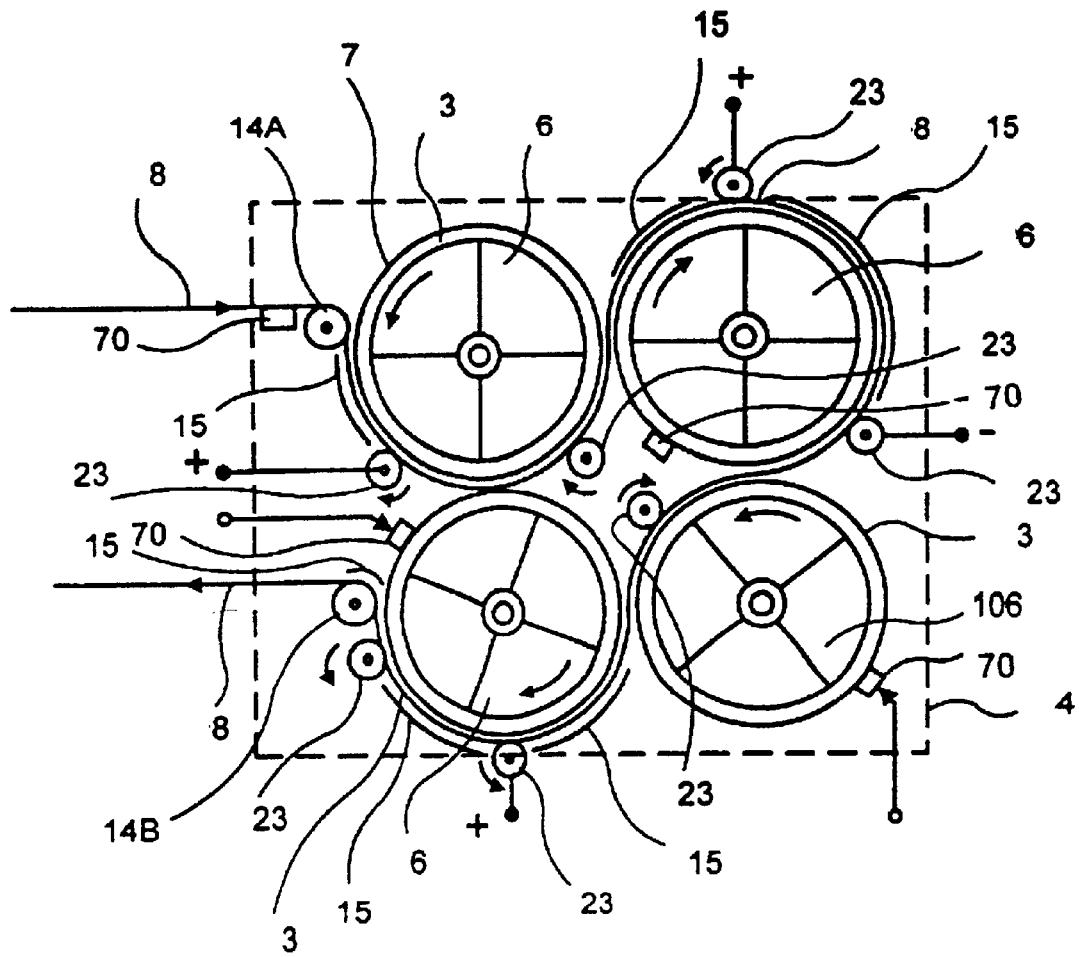
FIG. 1B is an elevated side view of the FCB system depicted in FIG. 1, showing the path of travel of the metal-fuel tape through the compact support fixture, and the location of tape path guides and cathode and anode contacting elements mounted therewithin, wherein the ionically-conductive medium is either applied to the rotating cathode cylinders or moving metal-fuel tape as a viscous gel, or integrated with the metal-fuel tape or moving cathode cylinders as a solid-state film, that is transported at substantially the same velocity as the metal-fuel tape and moving cathode cylinders at the locus of points at which the ionically-conductive medium contacts the metal-fuel tape and the cathode cylinder during system operation.
Figures 2A, 2B, 2C, 2D:
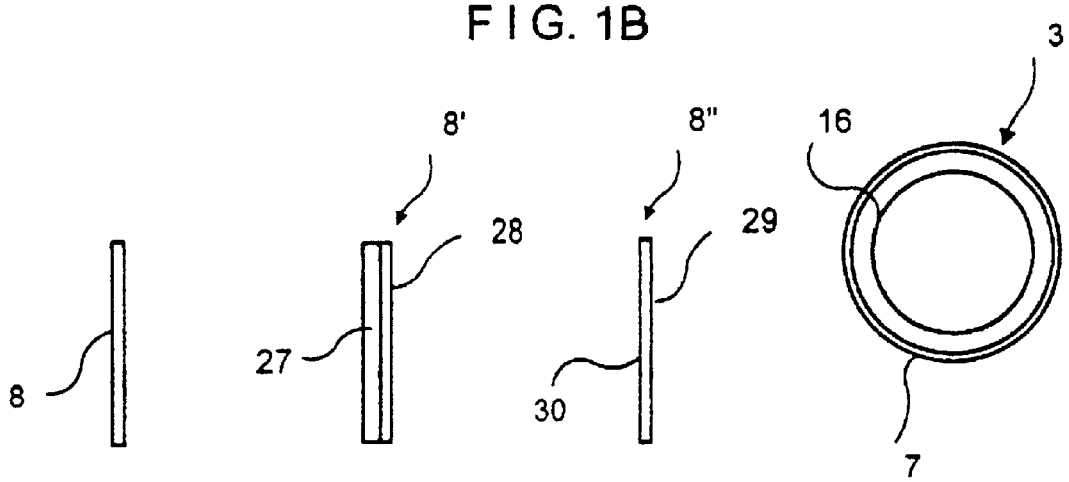
FIG. 2A is cross-sectional view of a section of a first type of metal-fuel tape that can be used in the system of FIG. 1, realized in the form of thin layer of metal fuel.
FIG. 2B. is cross-sectional view of a section of a second type of metal-fuel tape that can be used in the system of FIG. 1, realized by depositing metallic powder and binder on a substrate.
FIG. 2C is cross-sectional view of a section of a third type of metal-fuel tape that can be used in the system of FIG. 1, realized by impregnating metallic powder within a substrate material.
FIG. 2D is a cross-sectional view of a cathode cylinder in the system of FIG. 1, in which an ionically-conductive solid-state film layer is applied over the outer surface thereof.

As shown in FIGS. 1 through 2C, the first illustrative embodiment of the FCB system 1 comprises a metal-fuel tape discharging device (i.e. "engine") 2 containing a plurality of cylindrically shaped cathodes 3 rotatably mounted within a compact fixture (i.e. housing) 4. The actual, number of cathode cylinders provided for in any particular embodiment of the present invention will depend on the application at hand. Also, while it is understood that the actual physical arrangement of the cathode cylinders within the housing 4 will vary from application to application, it will be advantageous to arrange the cathode cylinders in an array formation (e.g. 3×3, 4×5, or N×M). The guiding principle when arranging a plurality of cylindrical cathodes within the fixture housing to construct a tape discharging engine should be maximize the volumetric power density characteristics of the metal-air FCB system.

In the illustrative embodiment of the present invention shown in FIG. 1, each of the cylindrical cathodes 3 in the engine 2 is realized as a plastic cylindrically-shaped structure having a hollow center 6 with fine perforations formed in the surface thereof. The function of these fine perforations is to permit oxygen transport to the interface formed between the ionically-conductive medium 7 and metal-fuel tape 8 transported over the respective cathode cylinder. In general, each cathode cylinder 3 can be made from plastic, ceramic, composite or other suitable material. The outer diameter of each cathode cylinder can be similar in size, or different in size, depending on factors such as velocity control, power generation capacity, etc.

As shown in FIG. 1, the compact housing 4 comprises a pair of spaced apart panels 4A and 4B having pairs of holes formed therein, within which each cathode cylinder in the array thereof can be rotatably mounted by way of bearings or like structures. Top and bottom panels can be used to maintain the spacing between panels 4A and 4B. Other panels can be used to enclose side openings of the housing. In general, each cathode cylinder 3 is rotated by a suitable drive mechanism which can be realized in a number of different ways, e.g. using an electric or pneumatic motor, gears, drive belts, or like devices known in the tape transport art. In the illustrative embodiment shown in FIG. 1, each of the cathode cylinders 3 is provided with a gear 9 formed at one end thereof which intermeshes with the gear of a neighboring cathode cylinder within the cathode array. A geared motor 10, coupled to the gear 11 meshing with one of the cathode cylinders, can be used to impart torque to a particular cathode cylinder, which in turn is imparted to all other cathode cylinders within the array. With this arrangement, the array of cathode cylinders mounted with the housing 4 cooperate to transport a supply 12 of metal-fuel tape 8 from cartridge 12, along a predetermined tape pathway within the housing of the system. As shown, tape guiding rollers 14A and 14B can be strategically installed within the engine housing 4 to guide the metal-fuel tape along the predetermined tape pathway through the housing. Also, tape guiding deflectors 15 can be strategically located within the housing to self-guide the metal-fuel tape through the housing, as well as assist in automatic (e.g. self) treading of metal-fuel tape being supplied from open-type reels and cartridge devices.

In general, details regarding the construction of the cathode cylinders of the present invention are disclosed in application Ser. No. 09/110,762 entitled "Metal Air-Fuel Cell Battery System Employing Metal Fuel Tape and Low-Friction Cathode Structures" filed on the same date hereof, now U.S. Pat. No. 6,289,997 and incorporated herein by reference in its entirety. As taught therein, and illustrated in FIG. 2D, a cathode element 16 is mounted over the outer surface of each cathode cylinder 3. Preferably, each cathode element 16 is made from nickel mesh fabric embedded within carbon and catalytic material. Preferably, the metal-fuel tape 8 is transported between a pair of supply and take-up reels 17A and 17B, contained within a cassette or like cartridge, as taught in Applicant's application Ser. No. 09/074,337. Also, the metal-fuel tape for use with the FCB system of FIG. 1 can be fabricated using any of the techniques taught in application Ser. No. 09/074,337.

In the event that the cathode-cylinder based engine 2 is employed within a Metal-Fuel Tape Discharging Subsystem, then each of the subsystems contained within the Metal-Fuel Tape Discharging Subsystem disclosed in application Ser. No. 09/074,337 can be incorporated into the system schematically depicted in FIG. 1. Thus, as taught in Applicant's application Ser. No. 09/074,337 and U.S. Pat. No. 6,296,860, the interior portion of each cylindrical cathode structure 3 in the cathode-cylinder based engine can be equipped with an oxygen-injection chamber (connected to an air pump or oxygen source), one or more $pO_2$ sensors, one or more temperature sensors, discharging head cooling equipment, and the like, so that system controller 20 can control the $pO_2$ level within the cathode element 16, as well as maintain the temperature of the discharging heads during discharging operations.

Similarly, in the event that the cathode-cylinder based engine 2 is employed within a Metal-Fuel Tape Recharging Subsystem, then each of the subsystems contained within the Metal-Fuel Tape Recharging Subsystem disclosed in application Ser. No. 09/074,337 can be incorporated into the system schematically depicted in FIG. 1. Thus, as taught in Applicant's application Ser. No. 09/074,337, the interior portion of each cathode cylinder 3 can be equipped with an oxygen-evacuation chamber (connected to a vacuum pump or like device), one or more $pO_2$ sensors, one or more temperature sensors, recharging head cooling equipment, and the like, so that system controller 20 can control the $pO_2$ level within each cathode element 16, as well as maintain the temperature of the recharging head during recharging operations.

As shown in FIG. 1, each cathode cylinder 3 is rotated about its axis of rotation at an angular velocity controlled by gears and drive unit (e.g. motor) driving the cathode cylinder. The metal-fuel tape 8 is transported over the surface of each cylindrical cathode element 16 by a fuel-tape transporter 21 operable during discharging and recharging operations. The cathode cylinder drive unit and the fuel-tape transporter 21 are controlled by system controller 20 so that the metal-fuel tape 8, array of cathode structures 3 and ionically-conductive medium are transported at substantially the same velocity at the locus of points at which the ionically-conducing medium contacts the metal-fuel tape and the cathode structures. By controlling the relative movement between the metal-fuel tape, ionically-conductive medium and the cathode cylinders within the engine housing, the system controller 20 effectively reduces the generation of frictional (e.g. shear) forces thereamong. This condition of operation results in a reduction in the amount of electrical power required to transport the metal-fuel tape, ionically-conductive medium and cathode structures, It also reduces shedding of metal-oxide particles from the metal-fuel tape and becoming embedded with the porus structure of the cathodes. In turn, this decreases likelihood of damage or destruction of the cylindrical cathode elements 16 and metal-fuel tape 8.

In general, velocity control among the cathode structure, ionically-conductive medium and metal-fuel tape can be achieved in various ways in the FCB system of FIG. 1. For example, one way would be to drive the array of cathode cylinders using a set of engaging gears, as shown in FIG. 1. Another way would be to drive the array of cathode cylinders using a belt structure that is also used to transport the metal-fuel tape 8 (e.g. between supply and take-up reels or hubs within a cassette type-device. Yet another way would be to drive the array of cathode cylinders using a first set of DC-controlled motors, while driving the supply and take-up hubs of the fuel cassette device using a second set of DC-controlled motors, synchronized with the first set of DC-controlled motors. Other ways of achieving velocity control will become apparent to those skilled in the art having had the benefit of reading the present disclosure.

In general, it will be desirable in most applications to mount a plurality of pairs of "rotatable" cathode and anode contacting elements 23 about each cathode cylinder shown in FIGS. 1 and 1A. Such an arrangement will enable maximum current collection from each rotating cathode cylinder in the FCB system, at the output voltage specified by the cathode and anode materials. Specifically, as shown in FIGS. 1 and 1A, an electrically-conductive "cathode-contacting" element 23A is rotatably supported at the ends of each cylindrical cathode structure 3 by a pair of brackets or like structures. When properly mounted, each cathode-contacting element 23A is arranged in electrical contact with its nickel mesh fabric exposed on the outer edge portion thereof and is permitted to rotate about the axis of rotation of the cathode-contacting element as the cylindrical cathode structure is rotated about the axis of rotation of the cylindrical cathode structure.

Also shown in FIG. 1, an electrically-conductive "anode contacting" element 23B is rotatably supported by a pair of brackets or like structures so that it is arranged in electrical contact with the underside surface of the metal-fuel tape 8, and permitted to rotate about the axis of rotation of the anode-contacting element as the metal-fuel tape is transported over the rotating cathode cylinder with the ionically-conductive medium disposed therebetween. As shown in FIG. 1, the cathode cylinder and anode contacting elements 23A and 23B are electrically connected to electrical conductors (e.g. wiring) 24 which are terminated at an output power controller 25. In turn, the electrical load 26 is connected to the output power controller 25 for receiving a supply of electrical power from the FCB system.

As shown in FIGS. 1 and 1A, during discharging operations, oxygen-rich air flows along the hollow central bore 6 formed through each cathode cylinder, and through the ultra fine perforations formed in the cathode structure to reach the interface between ionically-conductive medium (e.g. electrolyte) 7 and the metal-fuel tape 8. During recharging operations, oxygen liberated from reduced metal-fuel tape flows along the hollow central bore 6 formed through each cathode cylinder 3, and through the ultra fine perforations formed in the cathode structure to reaches the ambient environment.

In the illustrative embodiment shown in FIG. 1, the ionically-conductive medium 7 is realized as an ionically-conductive fluid or viscous gel applied in the form of a thin film over the outer surface of each cathode cylinder 3 in the FCB system. The ionically-conductive fluid/gel 7 can be applied to the surface of the cathode element or metal-fuel tape in either a continuous or periodic manner to ensure that ionically-conductive medium is sufficiently replenished during system operation and thus maintain an optimum level of hydroxide ion concentration at the interface between the ionically-conductive medium and metal-fuel tape. Notably, the required thickness of the ionically-conductive film layer will vary from application to application, but typically will depend on a number of factors including, for example, the electrical conductivity of the ionically-conductive medium, the current flow expected to be produced by the FCB system during discharging operations, the surface area of the cathode element, and the like.

Ionically-conductive fluid/gel 7 for use with the FCB system of FIG. 1 can be made using the following formula. One mole of potassium hydroxide (KOH) and one mole of calcium chloride are dissolved in 100 grams of water. The function of KOH is to provide a hydroxide ion source, whereas the function of calcium chloride is as a hygroscopic agent. Thereafter, one-half (0.5) of a mole of polyethylene oxide (PEO) is added to the mixture as an ion carrier. The mixture is then blended for about 10 minutes. Thereafter, 0.1 mole of cellulose methoxycarboxylic acid, a gellant, is added to the blended mixture. This procedure results in the generation of an ionically-conductive gel suitable for application to the surface of each cylindrical cathode element 16 within the FCB system or metal-fuel tape 8 transported through the FCB system.

Alternatively, ionically-conductive medium 7 can be realized as a solid-state ionically-conductive film applied to the outer surface of the cylindrical cathode element 16, or the inner surface of the metal-fuel tape. In this alternative embodiment of the present invention, the solid-state ionically-conductive film can be formed on the cathode element or the metal-fuel tape using either of the following formulas set forth below.

In accordance with the first formula, one mole of KOH, a hydroxide source, and 0.1 mole of calcium chloride, a hygroscopic agent, are dissolved in the mixed solvents of 60 milliliters of water and 40 milliliters of tetrahydrogen furan (THF). Thereafter, one mole of PEO is added to the mixture as an ion carrier. Then, the resulting solution (e.g. mixture) is cast (i.e. coated) as a thick film onto the outer surface of each cylindrical cathode element 16, or as a thick film onto the underside surface of the metal-fuel tape 8, as the case may be. Using the above formulation, ionically-conductive film can be obtained with a thickness in the range of about 0.2 mm to about 0.5 mm. As the mixed solvents (i.e. water and THF) within the applied film coating are allowed to evaporate, an ionically-conductive gel-like (i.e. solid state) film is formed on the outer surface of the cathode element 16, or on the underside surface of the metal-fuel tape 8, as the case may be.

According to the second formula, one mole of KOH and 0.1 mole of calcium chloride are dissolved in the mixed solvents of 60 milliliters of water and 40 milliliters of tetrahydrogen furan (THF). The function of KOH is as an ion source, whereas the function of the calcium chloride is as a hygroscopic agent. Thereafter, one mole of polyvinyl chloride (PVC) is added to the solution in an amount sufficient to produce a gel-like substance. The solution is then cast (coated) as a thick film onto the outer surface of each cathode element 16, or as a thick film onto on the underside surface of the metal-fuel tape, as the case may be. Using the above formulation, ionically-conductive film can be obtained with a thickness in the range of about 0.2 mm to about 0.5 mm. As the mixed solvents (i.e. water and THF) within the applied coating are allowed to evaporate, an ionically-conductive gel-like (i.e. solid state) film forms on the outer surface of each cylindrical cathode element 16, or on the underside surface metal-fuel tape, as the case may be.

When using the ionically-conductive media 7 described hereinabove, it will necessary to provide a means for achieving "wetting" between (1) the ionically-conductive medium 7 and the metal-fuel tape 8, and (2) the ionically-conductive medium 7 and each movable cathode cylinder 3. One way of achieving wetting would be to continuously or periodically apply a coating of water ($H_2O$) and/or electrolyte make-up solution to the surface of the metal-fuel tape 8 (and/or ionically-conductive medium 7) during system operation to enable a sufficient level of ionic transport between the metal-fuel tape and the ionically-conductive medium and also between the movable cathode cylinder and the ionically-conductive medium. Notably, the thickness of the water and/or electrolyte make-up coating applied to the metal-fuel tape (and/or the ionically-conductive medium) will depend on the transport speed of the metal fuel tape, its water absorption properties, surface temperature of the cathode cylinder etc. In the illustrative embodiment shown in FIG. 1, wetting of the metal-fuel tape and/or ionically-conductive medium can be carried out using applicator 70 and dispensing mechanism 71. It is understood, however, that other methods of wetting the metal-fuel tape, cathode cylinder and ionically-conductive medium may be used with excellent results.

While the illustrative embodiments schematically depicted in FIGS. 1 and 1A and described hereinabove are shown for use in single-cathode/single-anode type applications, it is understood that such system embodiments can be readily modified to include a plurality of electrically-isolated cathode elements formed about the cathode support cylinder for use with multi-track metal-fuel tape of the type taught in Applicant's application Ser. Nos. 09/074,337 and U.S. Pat. No. 6,296,960 supra. The primary advantage of such system modifications is that it will be possible to deliver electrical power at various output voltage levels required by particular electrical loads.

As shown in FIG. 2A, the first type of metal-fuel tape 8 is formed as a thin layer of metal-fuel material (e.g. zinc). The second type of metal-fuel tape 8' shown in FIG. 2B is formed by depositing a metallic powder (e.g. zinc powder) and binder (e.g. polyethylene) 27 on a polyester substrate 28. As shown in FIG. 2C, a third type of metal-fuel tape 8" is formed by impregnating metallic powder 29 (e.g. zinc powder) within a substrate material 30 such as polyvinyl chloride (PVC). Techniques for fabricating such forms of metal-fuel are described in application Ser. No. 09/074,337 and U.S. Pat. No. 6,296,960.

Second Illustrative Embodiment Of The FCB System

Figure 3:
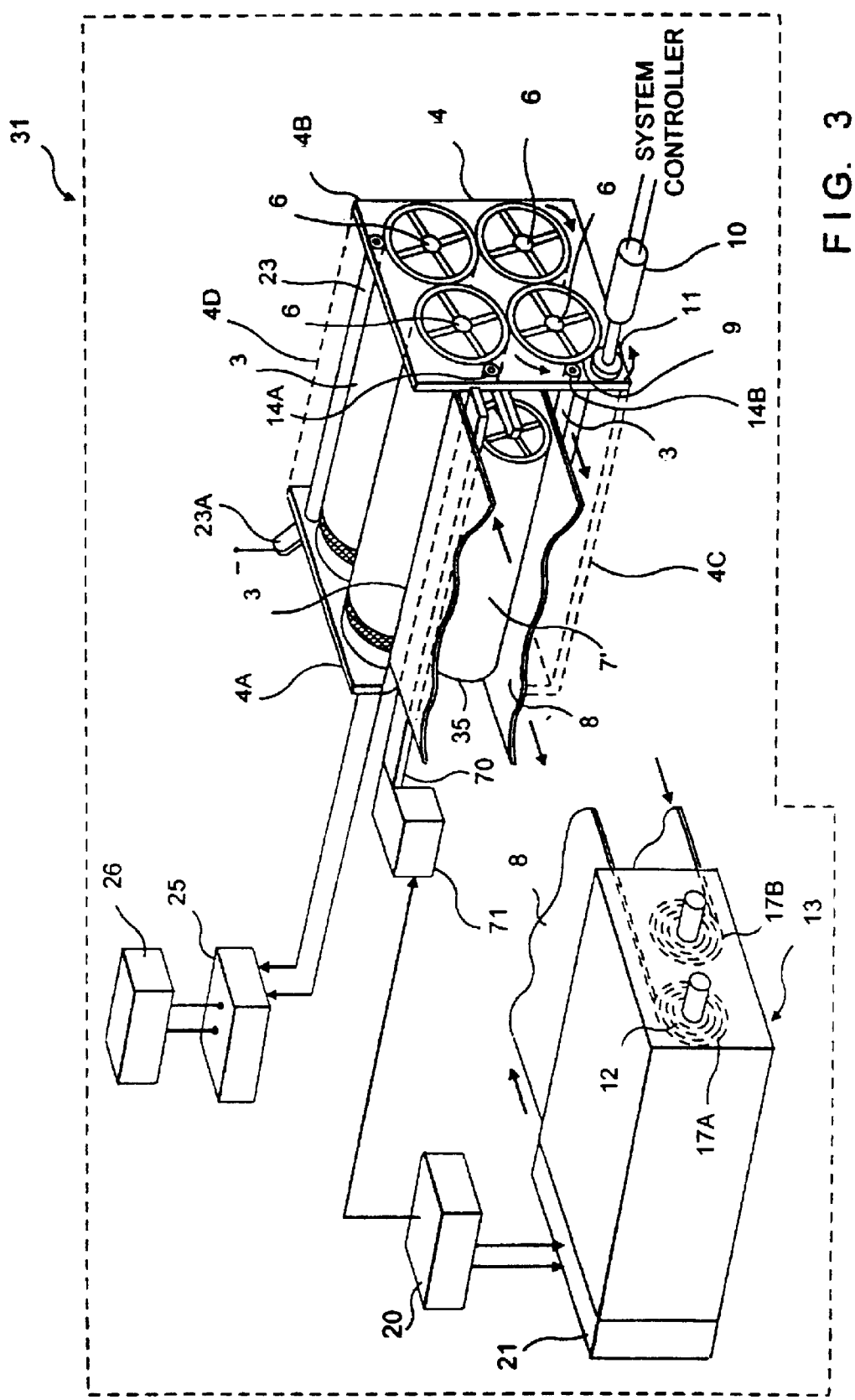
FIG. 3 is a schematic representation of a second illustrative embodiment of the metal-air fuel-cell battery (FCB) system of the present invention, wherein a plurality of cathode cylinders are rotatably mounted within a compact support fixture, and metal-fuel tape stored within a cassette-type cartridge is transported over the surface of the rotatably mounted cathode cylinders while an ionically-conductive belt structure is transported at substantially the same velocity as the metal-fuel tape and cathode cylinders at the locus of points at which the ionically-conductive belt contacts the cathode cylinders and metal-fuel tape.
Figure 7A:
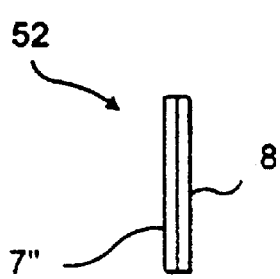
FIG. 7A is a cross-sectional view of a section of a first type of metal-fuel tape that can be used in the system of FIG. 6, realized in the form of thin layer of metal fuel, and coated on one-side thereof with a thin layer of ionically-conductive gel or solid-state film.
Figure 7B:
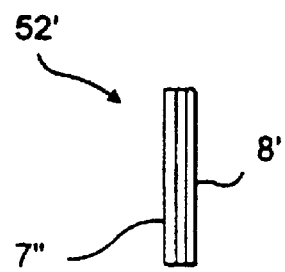
FIG. 7B is cross-sectional view of a section of a second type of metal-fuel tape that can be used in the system of FIG. 6, realized by depositing metallic powder and binder on a substrate, and coated on one-sided thereof with a thin layer of ionically-conductive gel or solid-state film.
Figure 7C:
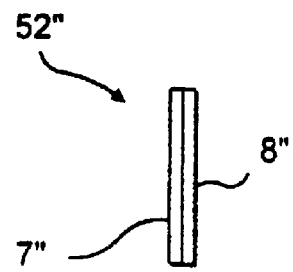
FIG. 7C is cross-sectional view of a section of a third type of metal-fuel tape that can be used in the system of FIG. 6, realized by impregnating metallic powder within a substrate material, and coated on one-side thereof with a thin layer of ionically-conductive gel or solid-state film.
Figure 8:
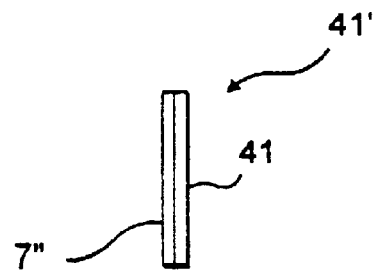
FIG. 8 is a cross-sectional view of a section of a first-type of cathode belt structure for use in the system of FIG. 6, on which an ionically-conductive viscous gel is applied during system operation, or an ionically-conductive solid-state film is applied during manufacture.

In FIG. 3, a second illustrative embodiment of the FCB system 31 is shown. This illustrative embodiment is similar to the FCB system shown in FIG. 1, except that in the system of FIG. 3, the ionically-conducting medium is realized as a solid-state ionically-conducting belt 7' which is transported through the predetermined tape pathway within the system housing, and about a belt transport cylinder 35 driven synchronously with the cathode cylinders in the FCB system. All other respects, the FCB system of FIG. 8 is similar to the FCB system of FIG. 7.

Figure 3A:
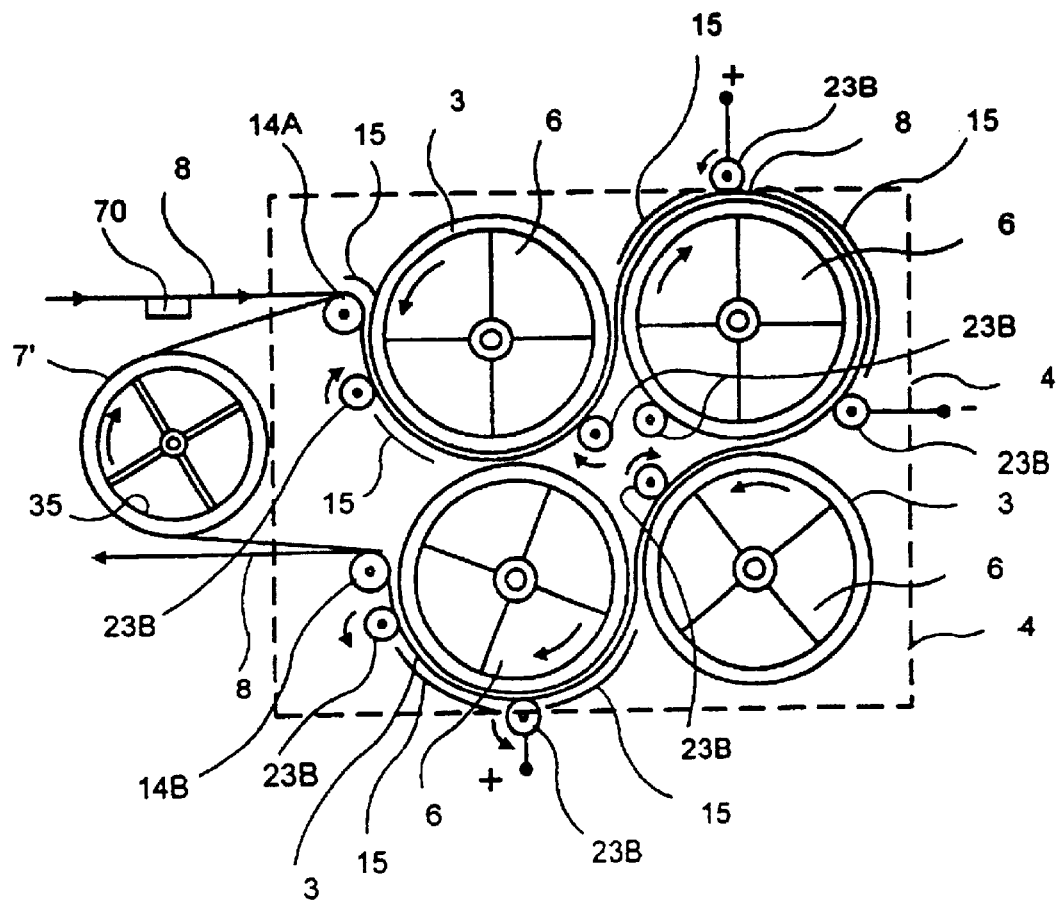
FIG. 3A is an elevated side view of the (FCB) system depicted in FIG. 3, showing the path of travel of the metal-fuel tape through the compact support fixture, and the location of path guides and cathode and anode contacting elements mounted therewithin, relative to the ionically-conductive belt structure.

As shown in FIGS. 3 and 3A, each cathode cylinder 3 is rotated about its axis of rotation at an angular velocity controlled by gears and drive unit (e.g. motor) 10 driving the cathode cylinder. The metal-fuel tape 8 is transported over the surface of each cylindrical cathode element 16 by fuel-tape transport mechanism 21 operable during discharging and recharging operations. The cathode cylinder drive unit 10 and fuel-tape transport mechanism 21 are controlled by system controller 20 so that the metal-fuel tape 8, array of cathode structures 3 and the solid-state, yet-flexible, ionically-conductive belt structure 7' are transported at substantially the same velocity at the locus of points at which the ionically-conducing medium 7' contacts the metal-fuel tape 8 and the cathode structures 16. By controlling the relative movement between the metal-fuel tape, ionically-conductive belt and the cathode cylinders within the engine housing, the system controller 20 effectively minimizes the generation of frictional (e.g. shear) forces thereamong. This reduces the amount of electrical the likelihood of damage to the cylindrical cathode elements 16 and metal-fuel tape 8.

In general, velocity control among the cathode structure, ionically-conductive belt and metal-fuel tape can be achieved in various ways in the FCB system of FIGS. 3 and 3A. For example, one way would be to drive the array of cathode cylinders using a set of engaging. gears, as shown in FIG. 1. Another way would be to drive the array of cathode cylinders using a belt structure that is also used to transport the metal-fuel tape 8 (e.g. between supply and take-up reels or hubs within a cassette type-device. Yet another way would be to drive the array of cathode cylinders using a first set of DC-controlled motors, while driving the supply and take-up hubs of the fuel cassette device using a second set of DC-controlled motors, synchronized with the first set of DC-controlled motors. Other ways of achieving velocity control will become apparent to those skilled in the art having had the benefit of reading the present disclosure.

In general, it will be desirable in most applications to mount a plurality of pairs of "rotatable" cathode and anode contacting elements about each cathode cylinder as shown in FIGS. 3 and 3A, and described hereinabove. As shown in FIG. 3, the cathode and anode contacting elements 23A and 23B are electrically connected to electrical conductors (e.g. wiring) 24 which are terminated at an output power controller 25. In turn, the electrical load is connected to the output power controller for receiving a supply of electrical power from the FCB system.

As shown in FIGS. 3 and 3A, during discharging operations, oxygen-rich air flows along the hollow central bore 6 formed through each cathode cylinder, and through the ultrafine perforations formed in the cathode structure to reach the interface between ionically-conductive belt (e.g. electrolyte) 7' and the metal-fuel tape 8. During recharging operations, oxygen liberated from reduced metal-fuel tape flows along the hollow central bore 6 formed through each cathode cylinder 3 and through the ultrafine perforations formed in the cathode structure 16 to reaches the ambient environment.

Figures 4, 5A, 5B, 5C:
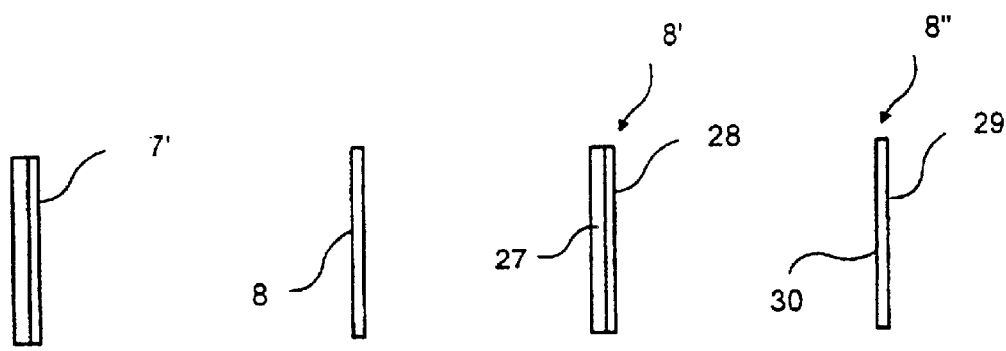
FIG. 4 is a cross-sectional view of a section of the ionically-conductive belt used in the system of FIG. 3.
FIG. 5A is cross-sectional view of a section of a first type of metal-fuel tape that can be used in the system of FIG. 3, realized in the form of thin layer of metal fuel.
FIG. 5B is cross-sectional view of a section of a second type of metal-fuel tape that can be used in the system of FIG. 3, realized by depositing metallic powder and binder on a substrate.
FIG. 5C is, cross-sectional view of a section of a third type of metal-fuel tape that can be used in the system of FIG. 3, realized by impregnating metallic powder within a substrate material.

In the illustrative embodiment shown in FIGS. 3 and 3A, the ionically-conductive belt 7' can be realized as flexible belt made from an open-cell polymer material having a porous structure, impregnated with an ionically-conductive material (e.g. KOH) capable of supporting ionic transport between the cathode and anode structures of the FCB system. ionically-conductive belt 7', schematically depicted in FIG. 4, can be realized as a solid-state membrane having ionic-conduction characteristics. In general, there will be many ways of making the ionically-conductive belt. For purposes of illustration, two formulas are described below.

In accordance with the first formula, one mole of KOH and 0.1 mole of calcium chloride are dissolved in the mixed solvents of 60 milliliters of water and 40 milliliters of tetrahydrogen furan (THF). The function of KOH is as a hydroxide ion source, whereas calcium chloride is as a hygroscopic agent. Thereafter, one mole of PEO is added to the mixture. Then, the solution is cast (or coated) as a thick film onto substrate made of polyvinyl alcohol (PVA) type plastic material. This material has been found to work well with PEO, although it is expect that other substrate materials having a surface tension higher than the film material should work as well with acceptable results. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane or film is formed. Using the above formulation, it is possible to form ionically-conductive films having a thickness in the range of about 0.2 to about 0.5 millimeters. Then, the solid-state membrane can be cut into a shape required to form a belt-like structure transportable about two or more rotating cylinders. The ends of the shaped membrane can be joined by an adhesive, ultra-sonic welding, appropriate fasteners or the like to form a solid-state ionically-conductive belt structure 7' for use in the FCB systems of the present invention.

In accordance with the second formula, one mole of KOH and 0.1 mole of calcium chloride are dissolved in the mixed solvents of 60 millimeters water and 40 millimeters of tetrahydrogen furan (THF). The function of KOH is as a hydroxide ion source, whereas calcium chloride is as a hygroscopic agent. Thereafter, one mole of polyvinyl chloride (PVC) is added to the mixture. Then, the resulting solution is cast (or coated) as a thick film onto a substrate made of polyvinyl alcohol (PVA) type plastic material. This material has been found to work well with PVC, although it is expected that other substrate materials having a surface tension higher than the film material should work as well with acceptable results. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane is formed. Using the above formulation, it is possible to form ionically-conductive films having a thickness in the range of about 0.2 to about 0.5 millimeters. Then, the solid-state film or membrane can be cut into a shape required to form a belt-like structure transportable about two or more rotating cylinders. The ends of the shaped membrane can be joined by an adhesive, ultra-sonic welding, appropriate fasteners or the like to form a solid-state ionically-conductive belt structure 7' for use in the FCB system of the present invention.

Metal-fuel tape for use in the FCB System of FIG. 3 can be realized in a variety of different ways. As shown in FIG. 5A, a first type of metal-fuel tape 8 is formed as a thin layer of metal-fuel material (e.g. zinc). A second type of metal-fuel tape 8" is formed by depositing a metallic powder (e.g. zinc powder) and binder (e.g. PVC) 27 on a polyester substrate 28. As shown in FIG. 5C, a third type of metal-fuel tape 8'" is formed by impregnating metallic powder 29 (e.g. zinc powder) within a substrate material 30 such as PVC. Techniques for fabricating such forms of metal-fuel are described in copending application Ser. No. 09/074,337.

When using the ionically-conductive belt 7" described hereinabove, it will necessary to provide a means for achieving "wetting" between (1) the ionically-conductive belt 7' and the metal-fuel tape 8, and (2) the ionically-conductive belt 7' and the movable cathode cylinder 3. One way of achieving wetting would be to continuously or periodically apply a coating of water ($H_2O$) to the surface of the metal-fuel tape (and/or ionically-conductive belt) during system operation to enable a sufficient level of ionic transport between the metal-fuel tape and the ionically-conductive belt and also between the movable cathode cylinder and the ionically-conductive belt. Notably, the thickness of the water coating applied to the metal-fuel tape (and/or the ionically-conductive belt) will depend on the transport speed of the metal fuel tape, its water absorption properties, temperature of the cathode cylinder surface, etc. In the illustrative embodiment shown in FIG. 3, wetting of the metal-fuel tape and/or ionically-conductive belt can be carried out using applicator 70 and dispensing mechanism 71. It is understood, however, that other methods of wetting the metal-fuel tape 8, ionically-conductive belt 7' and cathode cylinder 3 may be used with excellent results.

While the illustrative embodiment shown in FIG. 3 is designed for single-cathode/single-anode type applications, it is understood that this system embodiment can be readily modified to include a plurality of electrically-isolated cathode elements formed about the cathode support cylinder for use with multi-track type metal-fuel tape, as taught in Applicant's U.S. Pat. No. 6,296,960, supra.

Third Illustrative Embodiment Of The FCB System

Figure 6:
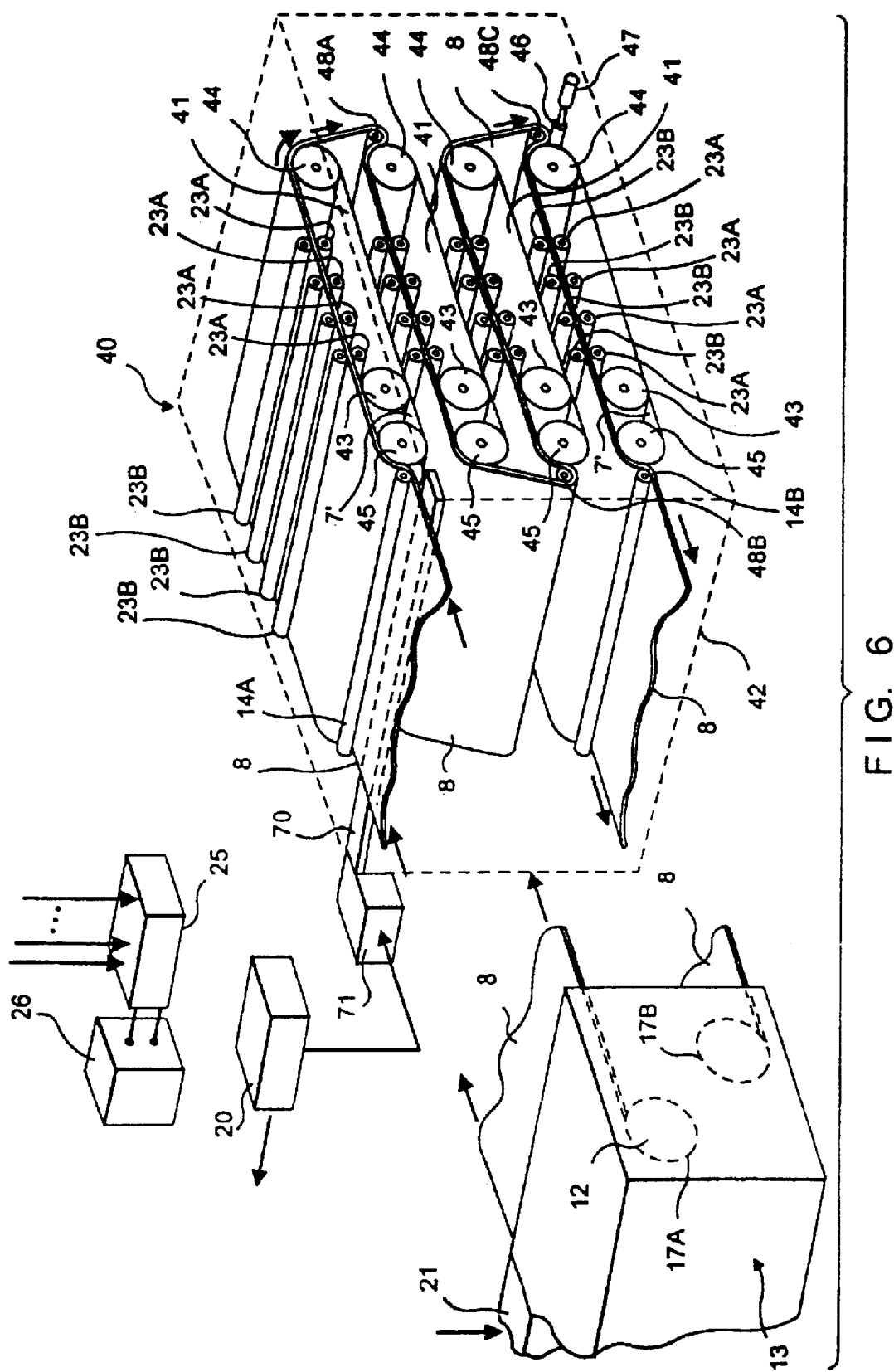
FIG. 6 is a third illustrative embodiment of the FCB system, wherein metal-fuel tape is transported over a plurality of cathode belt structures at substantially the same velocity at the locus of points at which the ionically-conductive medium contacts the metal-fuel tape and the cathode belt structure, and wherein each cathode-contacting structure engages the outer surface of the cathode belt structure and each corresponding anode-contacting structure is disposed opposite the cathode-contacting structure.

In FIGS. 6 and 6A, the third illustrative embodiment of the FCB system of the present invention comprises a metal-fuel tape discharging device (i.e. "engine") 40 containing a plurality of cathode belt structures 41 and a plurality of ionically-conductive belts 7' mounted within a compact fixture (i.e. housing) 42. As shown in FIGS. 6 and 6A, each cathode belt structure 41 is rotatably supported between a pair of belt transport cylinders 43 and 44 that are mounted within the system housing and driven at a required angular velocity by a belt drive mechanism. Similarly, each ionically-conductive belt 7' is rotatably supported between a pair of belt transport cylinders 44 and 45 that are mounted within the system housing and driven at a required angular velocity by a belt drive mechanism. Notably, in the illustrative embodiment, one of the belt transport cylinders 44 used to transport the ionically-conductive belt 7' will be the same transport cylinder used to transport the corresponding cathode belt structure 41. Also, a supply 12 of metal-fuel tape 8 is transported over each ionically-conductive belt structure 7' using tape transport drive mechanism 21 that cooperates with a pair of supply and take-up reels 17A and 17B as taught in Applicant's copending application Ser. No. 09/074,337.

The actual number of cathode belts 41 and ionically-conductive belts 71 employed in any particular embodiment of the present invention will depend on the application at hand. In some cases, as depicted in FIG. 6, one ionically-conducting belt is provided for each cathode belt structure employed in the FCB system. It is possible, in other alternative embodiments of the present invention, to use a single (common) ionically-conductive belt structure that is transported over each cathode belt structure in the FCB system, in a manner similar to that illustrated in the FCB system shown in FIG. 3. Also, while it is understood that the actual physical arrangement of the cathode belts within the housing 42 will vary from application to application, it will be advantageous to arrange the cathode belt structures in a stacked linear-array formation (e.g. 1×3, 1×5, or 1×M). The guiding principle when arranging a plurality of cathode belts within the fixture housing to construct a discharging-type engine should be to maximize the volumetric power density characteristics of the metal-air FCB system under design.

While not shown in FIGS. 6 and 6A for clarity. of exposition, the compact housing 42 could be constructed using a pair of spaced apart panels having pairs of holes formed therein, within which each belt transport cylinder 41 can be rotatably mounted by way of belt transport cylinders 43 and 44 utilizing bearings and/or like structures. Top and bottom panels 42E and 42D can be used to maintain the spacing between panels 42A and 42B. Other panels can be used to enclose side openings of the housing. There are numerous ways to realize a suitable housing for compactly containing the elements of the FCB system.

In general, each cathode belt 41 is transported between its transport cylinders by a suitable drive mechanism which can be realized in a number of different ways, e.g. using an electric or pneumatic motor, gears, drive belts, or like devices known in the tape transport art. Similarly, each ionically-conductive belt 7' is transported between its transport cylinders by a suitable drive mechanism which can be realized in a number of different ways, e.g. using an electric or pneumatic motor, gears, drive belts, or like devices known in the tape transport art. In the illustrative embodiment shown in FIG. 6, each of the belt transport cylinders 43 and 44 can be provided with a gear 46 formed at one end thereof which intermeshes with the gear of a neighboring belt transport cylinder within the system housing. A geared motor 47, coupled to the gear on one of the belt transport cylinders, can be used to impart torque to a particular belt transport cylinder 44, which in turn is imparted to all other belt transport cylinders within the housing 42. With this arrangement, the cathode belt structures 41 and ionically-conductive belt structures 7 installed within the housing cooperate with tape drive mechanism 21 to transport a supply of metal-fuel tape 12 from cartridge 13 along a predetermined tape pathway within the housing of the system schematically depicted in FIG. 6A. The belt drive mechanisms and tape drive mechanism are controlled by system controller 20 so that the velocity of both the metal-fuel tape 8 and corresponding cathode and ionically-conductive belt structures 41 and 7' respectively are maintained at substantially the same Velocity at the locus of points which the ionically-conducing belt structure 7 contacts the metal-fuel tape 8 and the corresponding cathode belt structure 41 during system operation. By controlling the relative movement between the metal-fuel tape, the cathode belt structures and ionically-conductive structures within the system, the system controller 20 effectively minimizes the generation of frictional forces therebetween and thus reduces damage to the cathode belt structure and metal-fuel tape.

In order guide the metal-fuel tape along the predetermined tape pathway through the housing, tape guiding rollers 48 can be strategically installed within the engine housing 42, as shown in FIG. 6A. Also, tape guiding deflectors can be strategically located within the housing to self-guide the metal-fuel tape through the housing, as well as assist in automatic (e.g. self) treading of metal-fuel tape being supplied from open-type reels and cartridge devices.

In the event that the cathode-belt based engine of FIG. 6 is employed within a Metal-Fuel Tape Discharging Subsystem, then each of the subsystems contained within the Metal-Fuel Tape Discharging Subsystem disclosed in copending application Ser. No. 09/074,337 can be incorporated into the system schematically depicted in FIG. 6. Thus, as taught in Applicant's application Ser. No. 09/074,337 and U.S. Pat. No. 6,296,960, those sections of each cathode belt at which electrical power is being generated can be equipped with an oxygen-injection chamber (connected to an air pump or oxygen source), one or more $pO_2$ sensors, one or more temperature sensors, discharging head cooling equipment, and the like, so that system controller can control the $pO_2$ level within the cathode belt structure as it is transported between its transport cylinders, as well as maintain the temperature of the discharging heads during discharging operations.

Similarly, in the event that the cathode-belt based engine of FIG. 6 is employed within a Metal-Fuel Tape Recharging Subsystem, then each of the subsystems contained within the Metal-Fuel Tape Recharging Subsystem disclosed in copending application Ser. No. 09/074,337 can be incorporated into the system schematically depicted in FIG. 6. Thus, as taught in Applicant's copending application Ser. No. 09/074,337, those sections of each cathode belt at which electrical power is being supplied (during recharging operations) can be equipped with an oxygen-evacuation chamber (connected to a vacuum pump or like device), one or more $pO_2$ sensors, one or more temperature sensors, recharging head cooling equipment, and the like, so that system controller 20 can control the $pO_2$ level within each cathode belt structure as it is transported between its transport cylinders, as well as maintain the temperature of the recharging head during recharging operations.

In general, velocity control among the cathode belts 41, ionically-conductive belts 7' and metal-fuel tape 8 can be achieved in various ways in the FCB system of FIG. 6. For example, one way would be to drive the cathode and ionically-conductive belts using a set of engaging gears, in a manner similar to that shown in FIG. 1. Another way, would be to drive the array of cathode belts and ionically-conductive using a belt structure that is also used to transport the metal-fuel tape (e.g. between supply and take-up reels or hubs within a cassette type-device). Yet another way would be to drive the array of cathode belts and ionically-conductive using a first set of DC-controlled motors, while driving the supply and take-up hubs of the fuel cassette device using a second set of DC-controlled motors, synchronized with the first set of DC-controlled motors. Other ways of achieving velocity control will become apparent to those skilled in the art having had the benefit of reading the present disclosure.

Figure 6C:
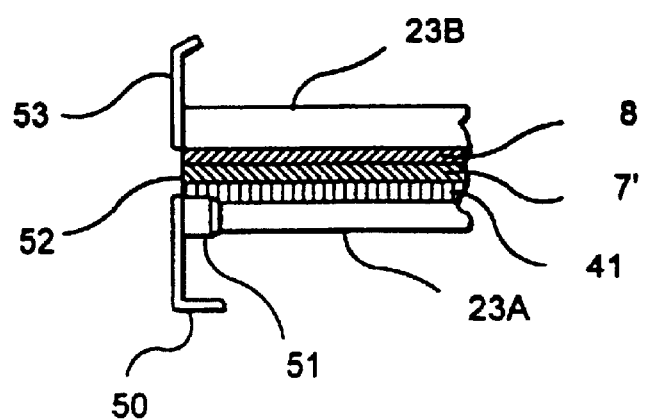
FIG. 6C is an partially cut-away cross-sectional view of one pair of cathode and anode contacting structures employed in the system shown in FIG. 6B, shown rotatably mounted relative to the cathode belt structure and metal-fuel tape disposed therebetween.

In general, it will be desirable in most applications to mount a plurality of pairs of "rotatable" cathode and anode contacting elements 23A and 23B respectively, along the length of each cathode belt structure shown in FIGS. 6 and 6A. Such an arrangement will enable maximum current collection from each cathode belt transported within the FCB system, at the output voltage specified by the cathode and anode materials. Specifically, as shown in FIG. 6C, an electrically-conductive "cathode-contacting" element 23B is rotatably supported at the ends of each cathode belt structure 41 by a pair of brackets or like structures 50. When properly mounted, the flange portion 51 on each cathode-contacting element 23B is arranged in electrical contact with the nickel mesh fabric 52 exposed on the outer edge portion of the cathode belt 41 and is permitted to rotate about the axis of rotation of the cathode-contacting element as the cathode belt structure 41 is transported past the cathode-contacting element 23B.

Also shown in FIG. 6C, an electrically-conductive "anode-contacting" element 23A is rotatably supported by a pair of brackets or like structures 53 so that it is arranged in electrical contact with the underside surface of the metal-fuel tape 8, and permitted to rotate about the axis of rotation of the anode-contacting element as the metal-fuel tape is transported over the moving cathode belt structure 41 with the ionically-conductive medium disposed therebetween. As shown in FIG. 6, the cathode and anode contacting elements 23A and 23B are electrically connected to electrical conductors (e.g. wiring) which are terminated at an output power controller 25. In turn, the electrical load 26 is connected to the output power controller 25 for receiving a supply of electrical power from the FCB system.

The cathode belt structure 41 employed in the FCB system of FIG. 6 has ultrafine perforations in the surface thereof to permit oxygen transport to the anodic metal-fuel tape 8 passing thereover. A preferred method of making the flexible cathode structure is to blend black Carbon powder (60%/weight), with a binder material such as PTFE emulsion(T-30 from Dupont) (20%/weight), and catalyst material such as magnesium dioxide $MnO_2$ (20%/weight) within 100 milliliters of water (solvent) and surfactant (e.g Triton X-10 from Union Carbide) 2.0%/weight in order to make a slurry. Then the slurry is cast or coated onto the Nickel sponge (or mesh fabric material). The slurry-coated nickel mesh fabric is then air dried for about 10 hours. Thereafter, dried article is compressed at 200 [pounds/cm$^2$] in to form flexible cathodic material having a desired porosity (e.g. 30–70%) and about 0.5–0.6 millimeters. It is understood, however, that the thickness and porosity of the cathode material may vary from application to application. The cathode material is then sintered at about 280 degree C for about 2 hours to remove the solvent (i.e. water) and provide a flexible sheet of cathodic material which can then be cut into the desired-dimensions to form a cathode belt structure for the FCB system under design. The ends of belt structure can be joined by soldering, fasteners, or the like to form a virtually seamless cathode surface about closed belt structure. The nickel mesh material 51 can be exposed at the ends of the cathode belt structure 41, as illustrated in FIG. 6C, to allow cathode contacting elements 23A to establish electrical contact therewith during discharging and recharging operations, as discussed above.

In the illustrative embodiment shown in FIGS. 6 and 6A, each ionically-conductive belt 7' can be realized as flexible belt made from an open-cell polymer material having a porous structure and impregnated with an ionically-conductive material (e.g. KOH) capable of supporting ionic transport between the cathode and anode structures of the FCB system. ionically-conductive belt 7' can be realized as a solid-state membrane having ionic-conduction characteristics. In general, there will be many ways of making the ionically-conductive belt. For purposes of illustration, two formulas are described below.

In accordance with the first formula, one mole of KOH and 0.1 mole of calcium chloride are dissolved in the mixed solvents of 60 milliliters of water and 40 milliliters of tetrahydrogen furan (THF). The function of KOH is as a hydroxide ion source, whereas calcium chloride is as a hygroscopic agent. Thereafter, one mole of PEO is added to the mixture. Then, the solution is cast (or coated) as a thick film onto substrate made of polyvinyl alcohol (PVA) type plastic material. This material has been found to work well with PEO, although it is expect that other substrate materials having a surface tension higher than the film material should work as well with acceptable results. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane or film is formed. Using the above formulation, it is possible to form ionically-conductive films having a thickness in the range of about 0.2 to about 0.5 millimeters. Then, the solid-state membrane can be cut into a shape required to form a belt-like structure transportable about two or more rotating cylinders. The ends of the shaped membrane can be joined by an adhesive, ultra-sonic welding, appropriate fasteners or the like to form a solid-state ionically-conductive belt structure 7' for use in the FCB system shown in FIG. 6.

In accordance with the second formula, one mole of KOH and 0.1 mole of calcium chloride are dissolved in the mixed solvents of 60 millimeters of water and 40 milliliters of tetrahydrogen furan (THF). The function of KOH is as a hydroxide ion source, whereas calcium chloride is as a hygroscopic agent. Thereafter, one mole of polyvinyl chloride (PVC) is added to the mixture. Then, the resulting solution is cast (or coated) as a thick film onto substrate made of polyvinyl alcohol (PVA) type plastic material. This material has been found to work well with PVC, although it is expect that other substrate materials having a surface tension higher than the film material should work as well with acceptable results. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane is formed. Using the above formulation, it is possible to form ionically-conductive films having a thickness in the range of about 0.2 to about 0.5 millimeters. Then, the solid-state film or membrane can be cut into a shape required to form a belt-like structure transportable about two or more rotating cylinders. The ends of the shaped membrane can be joined by an adhesive, ultra-sonic welding, appropriate fasteners or the like to form a solid-state ionically-conductive belt structure 7' for use in the FCB systems of the present invention.

When using the ionically-conductive belt 7' disclosed hereinabove, it will necessary to provide a means for achieving "wetting" between (1) the ionically-conductive belt 7' and the metal-fuel tape 8, and (2) the ionically-conductive belt 7' and the movable cathode belt 41. One way of achieving wetting would be to continuously or periodically apply a coating of water ($H_2O$) and/or electrolyte make-up solution to the surface of the metal-fuel tape 8 (and/or ionically-conductive belt 7') during system operation to enable a sufficient level of ionic transport between the metal-fuel tape and the ionically-conductive belt and also between the movable cathode belt and the ionically-conductive belt. Notably, the thickness of the water and/or electrolyte coating applied to the metal-fuel tape (and/or the ionically-conductive belt) will depend on the transport speed of the metal fuel tape, its water absorption properties, the temperature of the cathode belt, etc. In the illustrative embodiment shown in FIG. 6, wetting of the metal-fuel tape 8, the ionically-conductive belt 7' and the cathode belt 41 can be carried out using applicator 70 and dispensing mechanism 71. It is understood, however, that other methods of wetting the metal-fuel tape, ionically-conductive belt and cathode belt may be used with excellent results.

In general, controlling the velocity of the moving components in the FCB system of FIG. 6 can be achieved in various ways. For example, one way might be to drive belt transport cylinders 43 and 44 and 45 with a common belt structure that is also used to transport the metal-fuel tape (e.g. between supply and take-up reels or hubs 17A and 17B within a cassette type-device 13). Another way might be to drive transport cylinders 43, 44 and 45 with a first set of DC-controlled motors, while driving the supply and take-up hubs 17A and 17B of the metal-fuel cassette device 13 using a second set of DC-controlled motors, synchronized with the first and second DC speed-controlled motors. Other ways of achieving velocity control will become apparent to those skilled in the art.

In the event that the cathode-belt based engine 40 is employed within a Metal-Fuel Tape Discharging Subsystem, then each of the subsystems contained within the Metal-Fuel Tape Discharging Subsystem disclosed in copending application Ser. No. 09/074,337 can be incorporated into the system schematically depicted in FIG. 6. Thus, as taught in Applicant's application Ser. No. 09/074,337 and U.S. Pat. No. 6,296,960 those sections of the cathode belt structure 41 along which electrical current is generated can be enclosed by an oxygen-injection chamber (connected to an air pump or oxygen source), and having one or more $pO_2$ sensors, one or more temperature sensors, discharging head cooling equipment, and the like, so that system controller 22 can control the $pO_2$ level within this section of the moving cathode-belt structure 41, as well as maintain the temperature of the discharging head therealong during discharging operations.

Similarly, in the event that the cathode-belt based engine 40 is employed within a Metal-Fuel Tape Recharging Subsystem, then each of the subsystems contained within the Metal-Fuel Tape Recharging Subsystem disclosed in copending application Ser. No. 09/074,337 can be incorporated into the system schematically depicted in FIG. 6. Thus, as taught in Applicant's application Ser. No. 09/074,337 and U.S. Pat. No. 6,296,960, those sections of the cathode belt structure 41 along which electrical current is generated can be enclosed by an oxygen-evacuation chamber (connected to a vacuum pump-or like device), and having one or more $pO_2$ sensors, one or more temperature sensors, recharging head cooling equipment, and the like, so that system controller 20 can control the $pO_2$ level within these sections of the moving cathode belt structure 41, as well as maintain the temperature of the recharging head therealong during recharging operations.

As shown in FIG. 6, during tape discharging operations, oxygen-rich air flows through the ultra fine perforations formed in the cathode belt structure 41 and reaches the interface between the metal-fuel tape 8 and the corresponding ionically-conductive belt structure 7. During tape recharging operations, oxygen liberated from the interface between the metal-fuel tape 8 and the ionically-conductive belt structure 7 flows through the fine perforations formed in the cathode belt structure 41, to the ambient environment.

The FCB system of FIG. 6 can be readily modified in various ways. For example, the ionically-conductive belt structures 7' can be removed from the system, and in lieu thereof, a thin film of ionically-conductive gel 7 applied to the cathode belt structure 41 or metal-fuel tape 8 during system operation. This can be achieved using an electrolyte applicator, disposed beneath the metal-fuel tape 8, and fed by a dispenser governed by system controller 20. During operation, a thin layer of ionically-conductive gel 7 is dispensed from applicator over the surface of the metal-fuel tape contacting the cathode belt 41. Notably, the required thickness of the ionically-conductive film layer 7 will vary from application to application, but typically will depend on a number of factors including, for example, the electrical conductivity of the ionically-conductive medium, the current flow expected to be produced by the FCB system during discharging operations, the surface area of the cathode element, and the like.

Alternatively, the ionically-conductive belt structures 7' can be removed from the system shown in FIG. 6, and in lieu thereof, a solid-state ionically-conductive film layer 7" applied to the cathode belt structure 41 or metal-fuel tape 8 during manufacture thereof. In such modified systems, the required thickness of the ionically-conductive film layer 7" will also vary from application to application, but typically will depend on a number of factors including, for example, the electrical conductivity of the ionically-conductive medium, the current flow expected to be produced by the FCB system during discharging operations, the surface area of the cathode element, and the like.

In alternative embodiments of the present invention, the metal-fuel tape used with the FCB System of FIG. 6 can be realized in a variety of different ways. As shown in FIG. 7A, the first type of metal-fuel tape 52 is formed as a thin layer of metal-fuel material (e.g. zinc) 8 on which a thin layer of ionically-conductive solid-state film material 7" is deposited. The second type of metal-fuel tape 52' shown in FIG. 7B is formed by depositing a metallic powder (e.g. zinc powder) and binder (e.g. polyethylene) on a polyester substrate to form metal-fuel tape 8', and thereafter, depositing a thin layer of ionically-conductive solid-state film material 7" thereon. As shown in FIG. 7C, a third type of metal-fuel tape 52 is formed by impregnating metallic powder (e.g. zinc powder) within a substrate material such as polyvinyl chloride PVC to form metal-fuel tape 8", and thereafter, depositing a thin layer of ionically-conductive solid-state film material 7" thereon. Techniques for fabricating such forms of metal-fuel tape are described in application Ser. No. 09/074,337 and U.S. Pat. No. 6,296,960.

In FIG. 8, there is shown an alternative embodiment of cathode belt structure is shown for use in the FCB system of FIG. 6. This cathode belt structure can be made by either applying a thin layer of solid-state ionically-conductive film onto each cathode belt structure shown in the FCB system during manufacture of the cathode belt structures, or by applying a thin layer of ionically conducting gel onto each belt structure during system operation. Various techniques can be used to apply the ionically-conductive film layer to the cathode belt structure.

While the illustrative embodiment shown in FIG. 6 is designed for single-cathode/single-anode type applications, it is understood that this system embodiment can be readily modified to include a plurality of electrically-isolated cathode elements (tracks) formed along the flexible cathode belt structures for use with multi-track metal-fuel tape, as taught in Applicant's U.S. Pat. No. 6,296,960, supra.

Fourth Illustrative Embodiment of the FCB System

Figure 9:
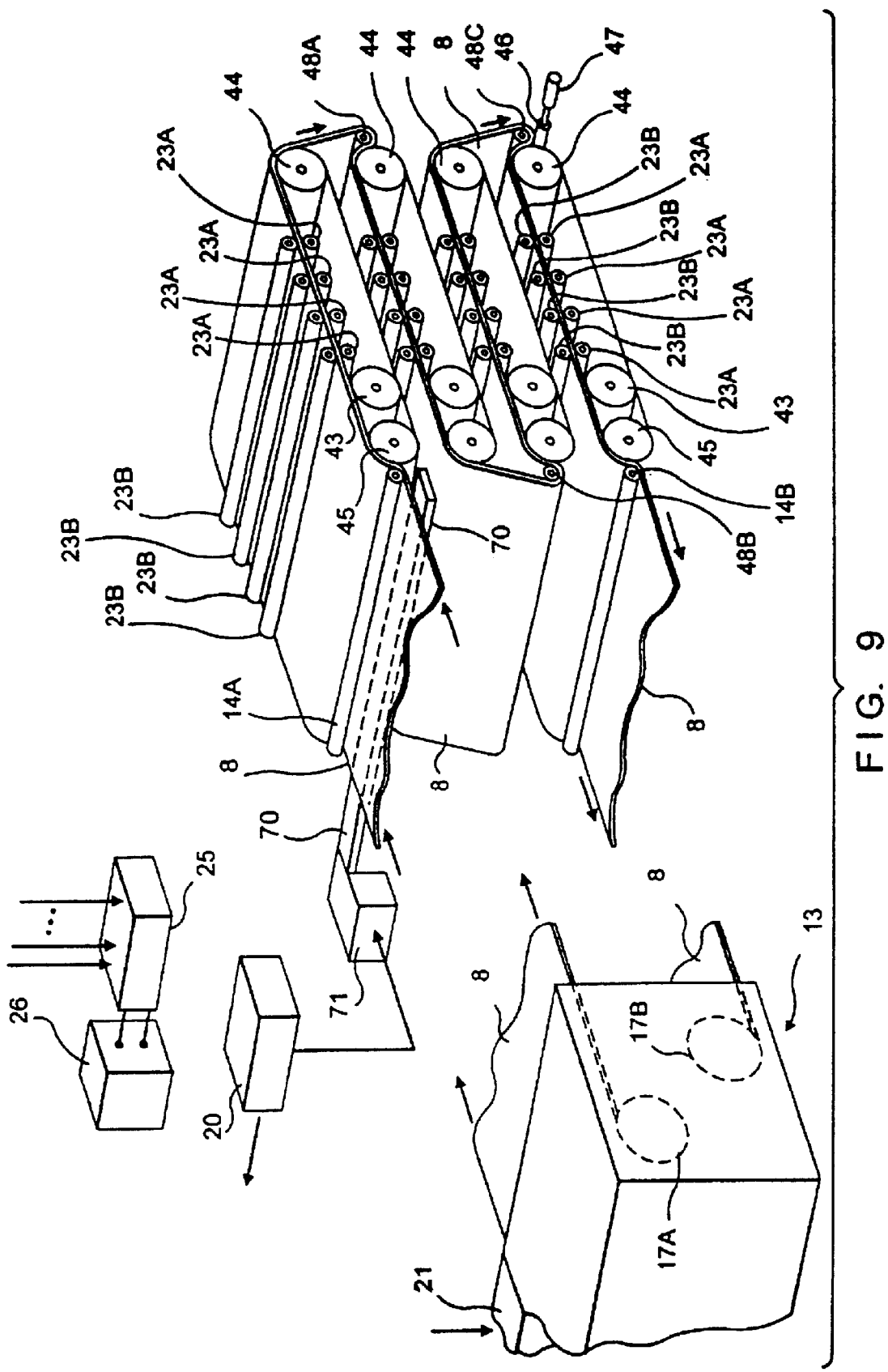
FIG. 9 is a fourth illustrative embodiment of the FCB system, wherein double-sided metal-fuel tape is transported over a common solid-state, ionically-conductive belt structure which, in turn, is transported over a plurality of cathode belt structures at substantially the same velocity at the locus of points at which the ionically-conductive belt contacts both the metal-fuel tape and the cathode belt structure, and wherein each cathode-contacting structure engages the outer surface of the cathode belt structure and each corresponding anode-contacting structure is disposed opposite the cathode-contacting structure.
Figures 9A, 9B:
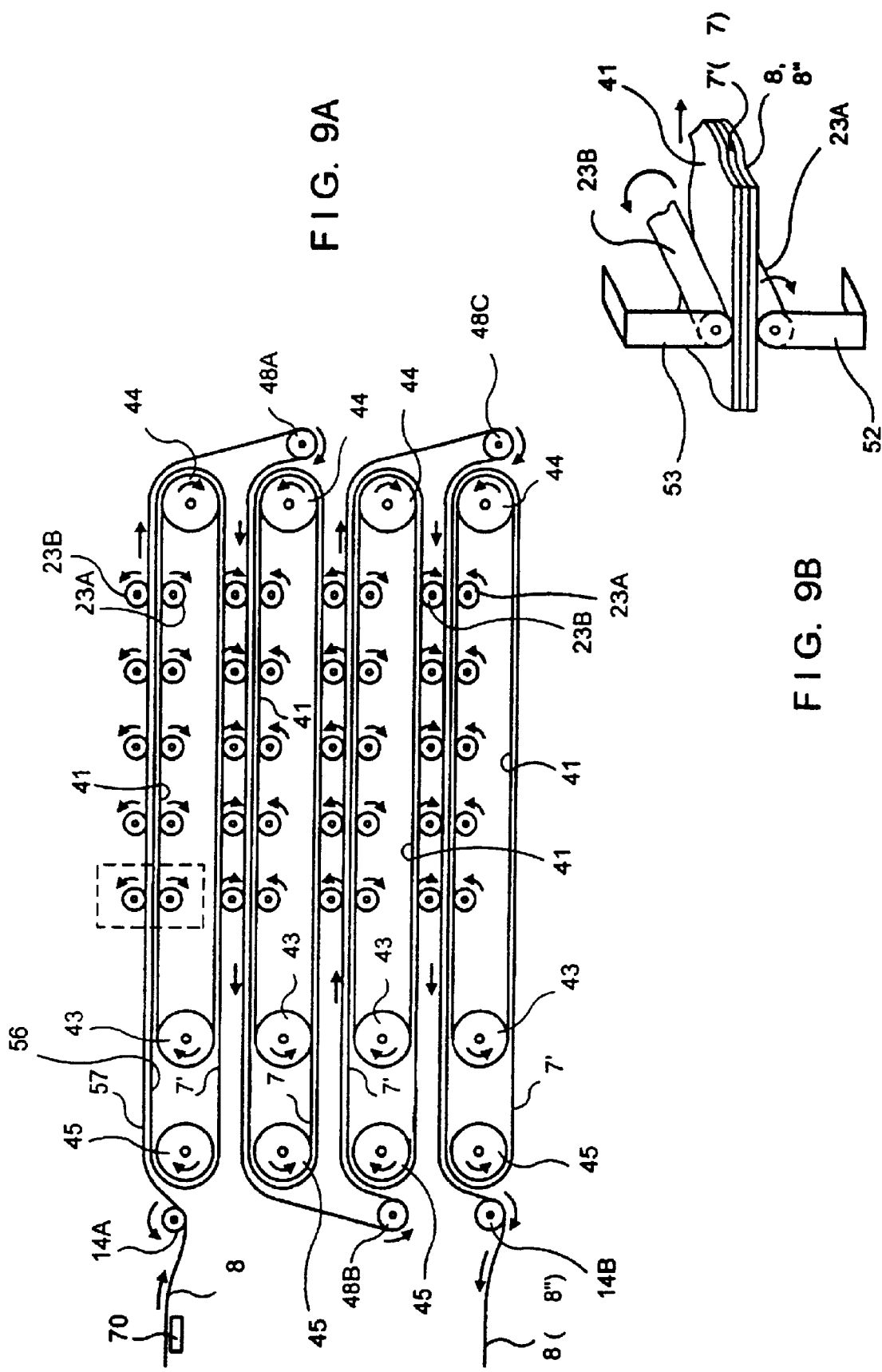
FIG. 9A is an elevated side view of the FCB system shown in FIG. 9.
FIG. 9B is an partially cut-away perspective view of one pair of cathode and anode contacting structures employed in the system of FIG. 9, shown rotatably mounted relative to the cathode belt structure and metal-fuel tape disposed therebetween.

In FIGS. 9 and 9A, the fourth illustrative embodiment of the FCB system is shown. This FCB system 55 is similar to the FCB system 40 shown in FIG. 6, expect that it is modified to use double-sided metal-fuel tape 55 to further improve the volumetric power density characteristics of the FCB system. The primary difference between these two systems is that in FIGS. 9 and 9A, the tape path configuration in FCB system 55 is designed so that metal-fuel tape transported through system 55 is discharged from both sides, thus achieving more efficient utilization of the metal-fuel tape. Notably, metal-fuel tape 8 and 8" are double-sided and thus adapted for use in FCB system 55. Metal-fuel tape 8' and 8" can be readily justified so that both sides of its substrate carry metal-fuel material. In all other respects, the FCB system of FIGS. 9 and 9A is similar to the FCB system of FIG. 6.

As shown in FIGS. 9 and 9A, the double-sided metal-fuel tape 8, 8" is discharged along its lower (i.e. inner) surface 56 as it is transported over the first set of cathode and ionically-conductive belts (41 and 71), and after routing about path-directing roller 14A is discharged along its upper (i.e. outer) surface 57 as it is transported over the second first set of cathode and ionically-conductive belts. As shown, after being routed about roller 48A, the double-sided metal fuel tape 8 is discharged once again along its lower (i.e. inner) surface 56 as it is transported over the third set of cathode and ionically-conductive belts, and after routing about path-directing roller 48B is discharged along its upper (i.e. outer) surface once again as it is transported over the fourth set of cathode and ionically-conductive belts. As shown in FIGS. 9 and 9A, a plurality of cathode and anode contacting elements 23A and 23B are rotatably mounted along each of the sets of cathode and ionically-conductive belts within the FCB system. In FIG. 9B, a pair of cathode and anode contacting elements 23A and 23B are shown in greater detail. As shown, metal-fuel tape 8 (8"), a section of ionically-conductive belt 7' and a section of cathode belt 41 (moving at the same velocity) are disposed between the cathode and anode contacting rollers, 23A and 23B, wherebetween electrical power is electrochemically generated during discharging operations.

While the illustrative embodiment shown in FIGS. 9 and 9A is designed for single-cathode/single-anode type applications, it is understood that this system embodiment can be readily modified to include a plurality of electrically-isolated cathode elements (tracks) formed along the flexible cathode belt structures for use with multi-track metal-fuel tape, as taught in Applicant's copending application Ser. No. 08/944,507, supra.

Fifth Illustrative Embodiment of the FCB System

Figure 10:
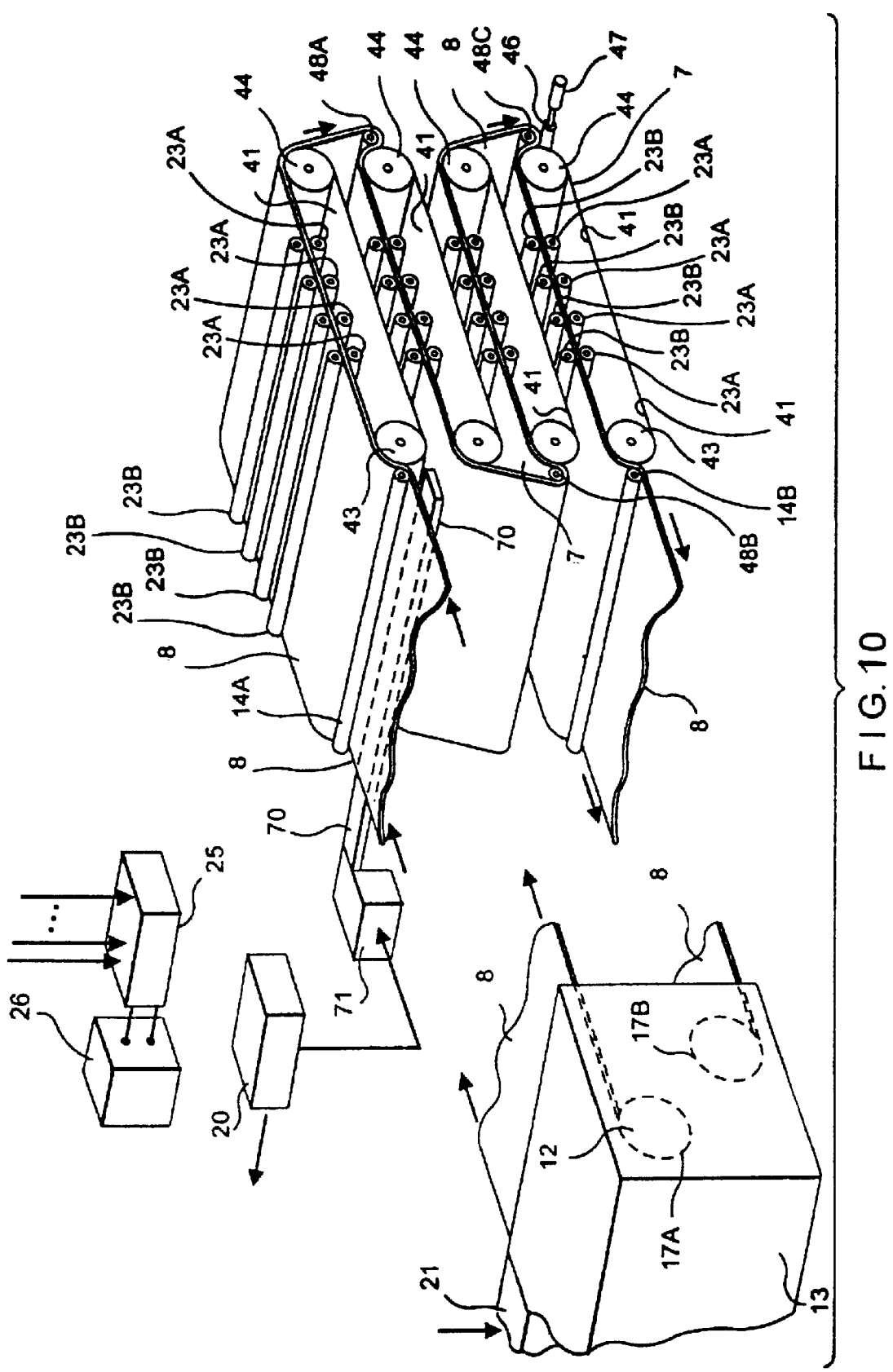
FIG. 10 is a fifth illustrative embodiment of the FCB system, wherein metal-fuel tape is transported over a plurality of cathode belt structures (each coated with an ionically-conductive film layer) at substantially the same velocity at the locus of points at which the ionically-conductive film coating contacts both the metal-fuel tape and the cathode belt structure, and wherein each cathode-contacting structure engages the outer surface of the cathode belt structure and each corresponding anode-contacting structure is disposed opposite the cathode-contacting structure.

In FIG. 10, the fifth illustrative embodiment of the FCB system is shown. This embodiment of the FCB system is similar to the FCB system shown in FIGS. 9 and 9A in which double-sided metal-fuel tape is used. The primary difference between these two systems is that in FIGS. 9 and 9A, the ionically-conductive medium is realized as an ionically-conductive film layer 7 applied over the outer surface of each cathode belt structure. In all other respects, the FCB system of FIG. 10 is similar to the FCB system of FIGS. 9 and 9A.

Figure 10A:
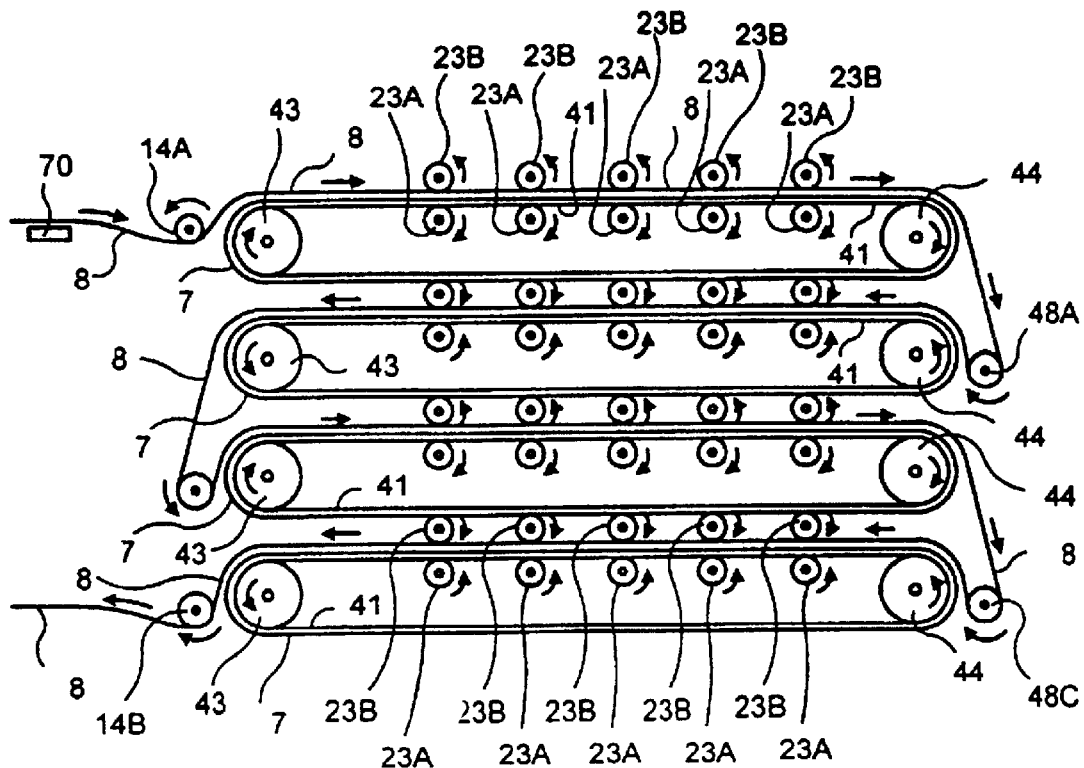
FIG. 10A is an elevated side view of the FCB system shown in FIG. 10.
Figure 10B:
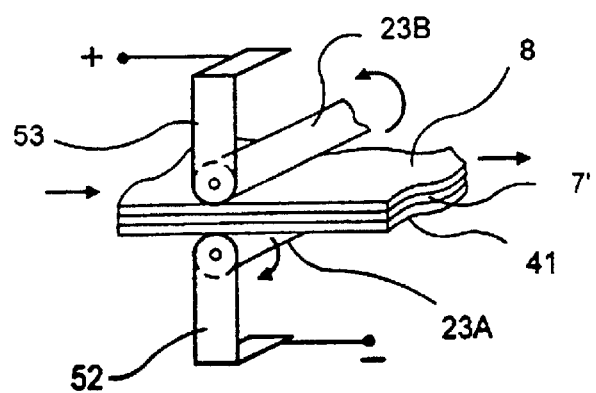
FIG. 10B is an partially cut-away perspective view of one pair of cathode and anode contacting structures employed in the system of FIG. 10, shown contacting the cathode belt structure and metal-fuel tape with ionically-conductive medium disposed therebetween.

In FIG. 10B, a pair of cathode and anode contacting elements 23A and 23B employed in FCB system of FIG. 10 are shown in greater detail. As shown in this figure, metal-fuel tape 8 (8"), a section of ionically-conductive belt 7' and a section of cathode belt 41 (moving at the same velocity) are disposed between the cathode and anode contacting rollers 42 and 43, wherebetween electrical power is electrochemically generated during discharging operations.

While the illustrative embodiment shown in FIG. 10 is designed for single-cathode/single-anode type applications, it is understood that this system embodiment can be readily modified to include a plurality of electrically-isolated cathode, elements (tracks) formed along the flexible cathode belt structures for use with multi-track metal-fuel tape, as taught in Applicant's U.S. Pat. No. 6,296,960, supra.

Sixth Illustrative Embodiment of the FCB System

Figure 11:
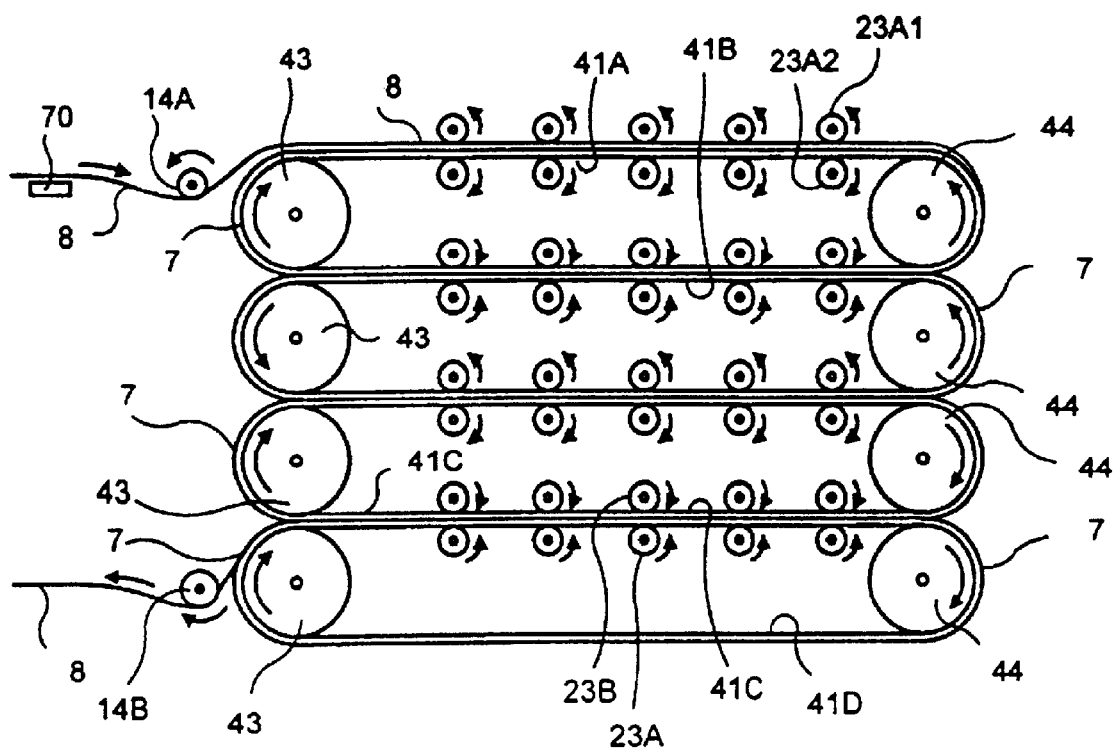
FIG. 11 is a sixth illustrative embodiment of the FCB system, wherein double-sided metal-fuel tape is transported over a plurality of cathode belt structures (each coated with an ionically-conductive film layer) at substantially the same velocity at the locus of points at which the ionically-conductive film layer contacts both the metal-fuel tape and the cathode belt structure, and wherein a pair of cathode-contacting structures engages the outer surfaces of a pair of cathode belt structures between which a pair of ionically-conductive belts and double-sided metal-fuel tape are interposed with an anode-contacting element engaging the double-sided metal-fuel tape.
Figure 11A:
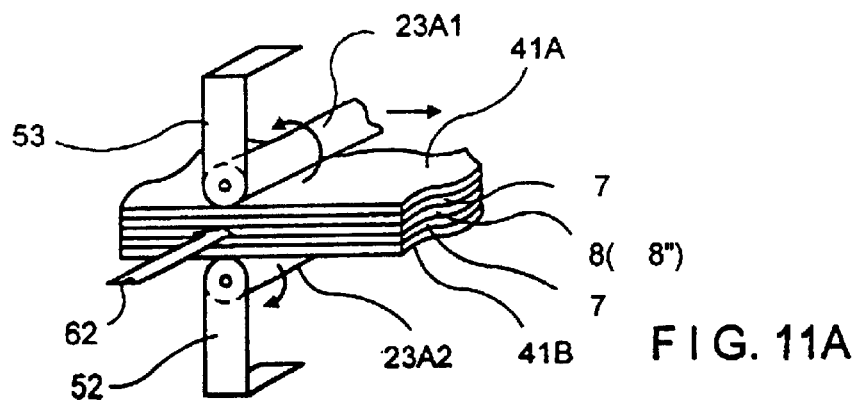
FIG. 11A is an partially cut-away perspective view of one set of cathode and anode contacting structures employed in the system of FIG. 14, shown contacting the cathode belt structures, with ionically-conductive belts and double-sided metal-fuel tape disposed therebetween.

In FIG. 11, the sixth illustrative embodiment of the FCB system is shown. This embodiment of the FCB system is similar to the FCB system shown in FIGS. 10 and 10A in which double-sided metal-fuel tape 8 (8") is used. The primary difference between these two systems is that in FIGS. 10 and 10A, adjacent pairs of cathode belts 41A and 41B, 41B and 41C and 41C and 41D are mounted closely together. As shown in FIG. 10A, the double-sided metal-fuel tape can be discharged from both its upper. and lower sides in order to improve the volumetric power density of the FCB system. This modification requires the use of a cathode and anode contacting mechanism of the type illustrated in FIG. 11A. As shown therein, a pair of neighboring cathode belts 41A and 41B are contacted by a pair of cathode contacting elements 23A1 and 23A2, respectively, rotatably mounted from the system housing, while metal-fuel tape transported through the mechanism is contacted by a common anode contacting element 62 rotatably mounted from the system housing. This arrangement enables both sides of double-sided metal-fuel tape 8 (8") to be simultaneously discharged. In all other respects, the FCB system of FIG. 11 is similar to the FCB system of FIGS. 10 and 10A.

Alternatively, the FCB system of FIG. 11 can be modified in a variety of ways. One way is to remove the ionically-conductive layer from the cathode belt structures, and in lieu thereof, form an ionically-conductive solid-state (or gel) film 7" onto each side of the metal-fuel tape 8 (8") being transported through the discharging engine.

While the illustrative embodiment shown in FIG. 11 is designed for single-cathode/single-anode type applications, it is understood that this system embodiment can be readily modified to include a plurality of electrically-isolated cathode elements (tracks) formed along the flexible cathode belt structures for use with multi-track metal-fuel tape, as taught in Applicant's copending application Ser. No. 08/944,507, supra.

Seventh Illustrative Embodiment of the FCB System

Figure 12:
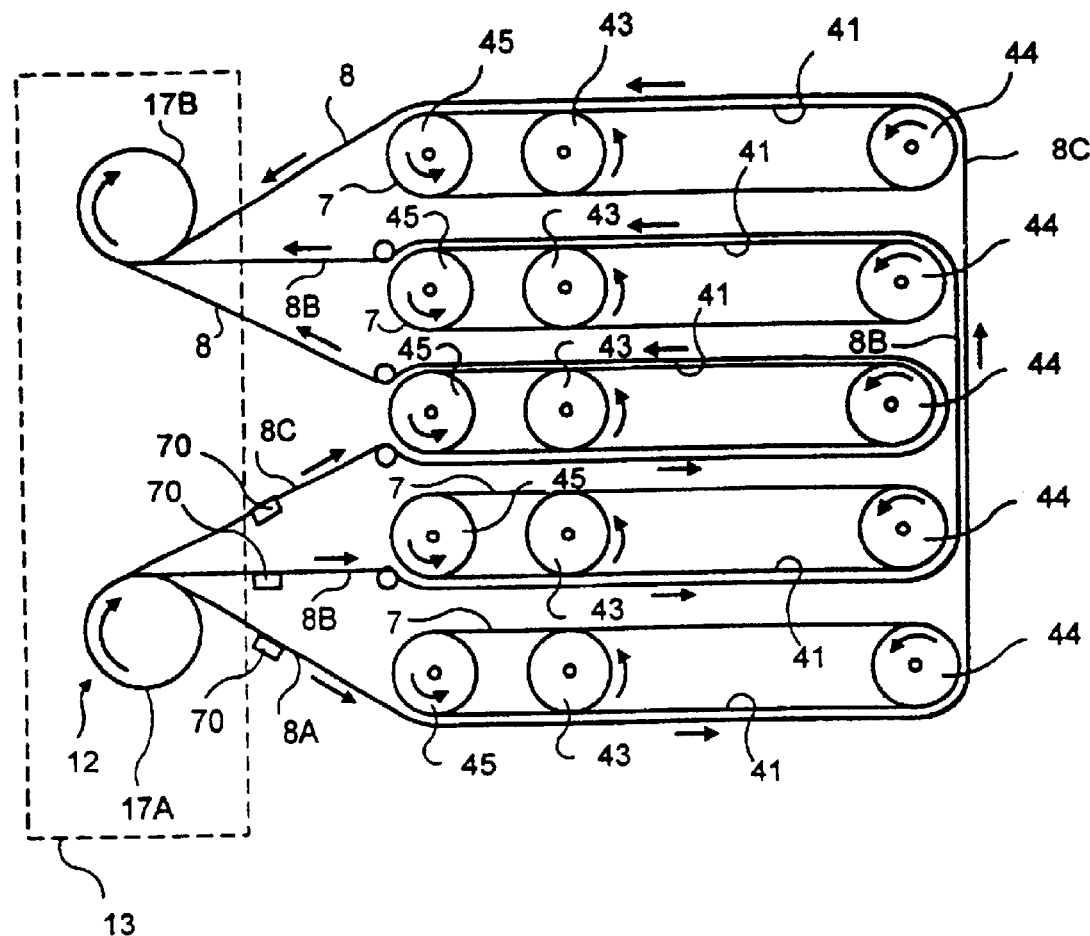
FIG. 12 is a seventh illustrative embodiment of the FCB system, wherein multiple streams of metal-fuel tape are simultaneously transported over a plurality of cathode belt structures, and simultaneously taken up on a take-up reel in order to reduce bending of metal-fuel tape during system operation.

In FIG. 12, the seventh illustrative embodiment of the FCB system is shown. This embodiment of the FCB system is similar to the FCB system shown in FIGS. 10 and 10A. The primary difference between these two systems is that in FIG. 12, the plural streams of metal-fuel tape 8A, 8B and 8C (8'A, 8'B, 8'C), (8"A, 8"B, 8""C) are supplied from the supply reel 17A, transported about a plurality of cathode belt structures 41 (and ionically-conductive belts 7'), and then taken-up by a take-up reel 18B associated with a tape cartridge 13 or like device, as taught in Applicant's U.S. Pat. No. 6,296,960, supra. This arrangement enables a significant reduction in the bending radius of the metal-fuel tape as it is transported between the supply and take-up reels of the tape cartridge device or like device employed in the FCB system.

Alternative Embodiments of The FCB System of The Present Invention

Having described the illustrative embodiments of the present invention in great detail above, several modifications thereto readily come to mind which would be advantageous in the practice of the present invention.

In order to eliminate the need to separately drive and actively control the velocity of the metal-fuel tape, the movable cathode structures and ionically-conductive medium in the FCB system hereof using complex mechanisms, the present invention also contemplates creating a condition of "hydrostatic drag" between the metal-fuel tape and the ionically-conductive medium (e.g. belt or applied gel/solid-state film), and the ionically-conductive medium (e.g. belt or applied gel/solid-state film and the cathode structure (e.g. cylinder or belt). By virtue of the hydrostatic drag, the metal-fuel tape, ionically-conductive medium and movable cathode structure can be moved at substantially the same velocity (at points of contact therebetween) by transporting only one of these movable system components (e.g. metal-fuel tape, ionically-conductive medium, or movable cathode structure) using, for example, a motor or like device driven by mechanical (e.g. spring-wound), electrical, or pneumatic forces. This method of transport and velocity equalization significantly reduces the complexity of the FCB system as well as the cost of manufacture and maintenance thereof. Also, it enables the metal-fuel tape, ionically-conductive medium, and cathode structures to be moved within the system without generating significant frictional (e.g. shear) forces, and thus transporting these moving components using torque-control (or current control) techniques regulated by the output power requirements set by electrical loading conditions at any instant in time.

Hydrostatic drag can be created between these moving system components by maintaining a sufficient level of surface tension between the ionically-conductive medium and the metal-fuel tape, and the ionically-conductive medium and the movable cathode structure during system operation. When using the ionically-conductive media disclosed hereinabove, sufficient surface tension can be created between the three primary moving components of the FCB system by continuously or periodically applying an even coating of water ($H_2O$) and/or electrolyte make-up solution to the surface of the metal-fuel tape (and/or ionically-conductive medium) so that, during system, operation "wetting" occurs between (1) the ionically-conductive medium and the metal-fuel tape, and (2) the ionically-conductive medium and the movable cathode structure. Notably, the thickness of the water coating and/or electrolyte make-up solution applied to the metal-fuel tape (and/or the ionically-conductive medium) will depend on the transport speed of the metal fuel tape, its water absorption properties, etc. In each of the illustrative embodiments disclosed herein, wetting of the metal-fuel tape and/or ionically-conductive medium can be carried out using applicator 70 and dispensing mechanism 71 shown in the figure drawings hereof. It is understood, however, that other methods of wetting the metal-fuel tape and/or ionically-conductive medium may be used with excellent results.

For example, in the illustrative embodiment shown in FIG. 1, periodic or continuous wetting of the metal-fuel tape 8 and the ionically-conductive coating 7 on each cathode cylinder 3 can create sufficient surface tension therebetween, and thus sufficient hydrostatic drag, to enable each cathode cylinder within the system to passively move (i.e. rotate) at the same velocity, as the metal-fuel tape in contact therewith while only the metal-fuel tape 8 is being actively driven by its tape transport mechanism 21. In this alternative embodiment of the present invention, the use of cathode cylinder drive unit 10 and velocity equalization by system controller 20 can be eliminated while still achieving the principles of the present invention. This modification would reduces the complexity of the system as well as its cost of manufacture and maintenance.

In the illustrative embodiment shown in FIG. 3, periodic or continuous wetting of the ionically-conductive belt 7', the metal-fuel tape 8 and each cathode cylinder 3 can create sufficient surface tension therebetween, and thus sufficient hydrostatic drag, to enable each cathode cylinder 3 within the system to passively move at the same velocity as the metal-fuel tape in contact therewith while only the metal-fuel tape 8 is being actively driven by its tape transport, mechanism 21. In this alternative embodiment of the present invention, the use of cathode cylinder drive unit 10 and velocity equalization by system controller 20 can be eliminated while still achieving the principles of the present invention. This modification would reduces the complexity of the system as well as its cost of manufacture and maintenance.

In the illustrative embodiment shown in FIG. 6, periodic or continuous wetting of the metal-fuel tape 8, ionically-conductive belt 7', and cathode belt 41 can create sufficient surface tension therebetween, and thus sufficient hydrostatic drag, to enable each cathode belt 41, belt transport cylinders 43 and 44, ionically-conductive belt 7' and belt cylinder 45 to passively rotate at the same velocity as the metal-fuel tape 8 in contact therewith while only the metal-fuel tape is being actively driven by its tape transport mechanism 21. In this alternative embodiment of the present invention, the use of cylinder drive units 47 and velocity equalization by system controller 22 can be eliminated while still achieving the principles of the present invention. Alternatively, it may be possible in some instances to actively drive one ionically-conductive belt 7' and/or corresponding cathode belt 41 and allow the other cathode belts 41, ionically-conductive belts 7' and metal fuel tape 8 to passively move at the same velocity as the actively-driven cathode belt with minimal slippage. In either case, such modifications will reduce the complexity of the system as well as its cost of manufacture and maintenance.

In the illustrative embodiment shown in FIG. 9, periodic or continuous wetting of the metal-fuel tape 8, ionically-conductive belt 7', and cathode belt 41 can create sufficient surface tension therebetween, and thus sufficient hydrostatic drag, to enable each cathode belt 41, belt transport cylinders 43 and 44, ionically-conductive belt 7' and belt cylinder 45 to passively rotate at the same velocity as the metal-fuel tape 8 in contact therewith while only the metal-fuel tape is being actively driven by its tape transport mechanism 21. In this alternative embodiment of the present invention, the use of cylinder drive units 47 and velocity equalization by system controller 22 can be eliminated while still achieving the principles of the present invention. Alternatively, it may be possible in some instances to actively drive one ionically-conductive belt 7' and/or corresponding cathode belt 41 and allow the other cathode belts 41, ionically-conductive belts 7' and metal fuel tape 8 to passively move at the same velocity as actively-driven cathode belt with minimal slippage. In either case, such modifications will reduce the complexity of the system as well as its cost of manufacture and maintenance.

In the illustrative embodiment shown in FIG. 10, periodic or continuous wetting of the metal-fuel tape 8 and the ionically-conductive film coating 7 can create sufficient surface tension therebetween, and thus sufficient hydrostatic drag, to enable each cathode belt 41 and belt transport cylinders 43 and 44 to passively rotate at the same velocity as the metal-fuel tape 8 in contact therewith while only the metal-fuel tape is being actively driven by its tape transport mechanism 21. In this alternative embodiment of the present invention, the use of cylinder drive units 47 and velocity equalization by system controller 22 can be eliminated while still achieving the principles of the present invention. Alternatively, it may be possible in some instances to actively drive one cathode belt 41 and allow the other cathode belts and metal fuel tape 8 to passively move at the same velocity as the actively driven cathode belt 41 with minimal slippage. In either case, such modifications will reduce the complexity of the system as well as its cost of manufacture and maintenance.

In the illustrative embodiment shown in FIG. 11, periodic or continuous wetting of the metal-fuel tape 8 and the ionically-conductive film coating 7 can create sufficient surface tension therebetween, and thus sufficient hydrostatic drag, to enable each cathode belt 41 and belt transport cylinders 43 and 44 to passively rotate at the same velocity as the metal-fuel tape 8 in contact therewith while only the metal-fuel tape is being actively driven by its tape transport mechanism 21. In this alternative embodiment of the present invention, the use of cylinder drive units 47 and velocity equalization by system controller 22 can be eliminated while still achieving the principles of the present invention. Alternatively, it may be possible in some instances to actively drive one cathode belt 41 and allow the other cathode belts and metal fuel tape 8 to passively move at the same velocity as the actively-driven cathode belt with minimal slippage. In either case, such modifications will reduce the complexity of the system as well as its cost of manufacture and maintenance.

The above-described FCB systems of the present invention can be used to power various types of electrical circuits, systems and devices, including, but not limited to, power tools, consumer appliances, stand-alone portable generators, vehicular systems, and the like.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying Claims to Invention.

What is claimed is:

1. A metal-air fuel cell battery system for generating electrical power, comprising:
    a movable cathode structure mounted within a housing to enable movement about a closed path;
    a supply of metal-fuel tape transportable relative to said movable cathode structure;
    a solid-state ionically-conductive medium transportable relative to both said movable cathode structure and said metal-fuel tape and disposed between said movable cathode structure and said metal-fuel tape during system operation, for contacting said movable cathode structure and said metal-fuel tape during system operation, and supporting ionic conduction between said movable cathode structure and said metal-fuel tape during system operation;
    a transport mechanism for actively transporting at least one of said movable cathode structure, said metal-fuel tape and said ionically-conductive medium relative to said housing; and
    a surface tension maintenance mechanism including a dispenser and an applicator for applying a coating of water (H2O) and/or an electrolyte make-up solution to the surface of said metal-fuel tape and/or said ionically-conductive medium during system operation so that, during system operation, wetting occurs between (i) said ionically-conductive medium and said metal-fuel tape, and (ii) said ionically-conductive medium and said movable cathode structure, thereby maintaining a sufficient level of surface tension between (i) said ionically-conductive medium and said metal-fuel tape and/or (ii) said ionically-conductive medium and said movable cathode structure during system operation so as to cause said metal-fuel tape, said ionically-conductive medium and said movable cathode structure to move at substantially the same velocity at points of contact therebetween, by virtue of hydrostatic forces created by said maintained level of surface tension.

2. The metal-air fuel cell battery system of claim 1, wherein the thickness of said coating of water and/or said electrolyte make-up solution depends on the speed and water absorption properties of said metal fuel tape.

3. The metal-air fuel cell battery system of claim 1, wherein said wetting device comprises a mechanism for dispensing and applying said coating of water and/or said electrolyte make-up solution to the surface of said metal-fuel tape and/or said ionically-conductive medium.

4. The metal-air fuel cell battery system of claim 1, wherein said transport mechanism comprises a motor driven by either mechanical, electrical, or pneumatic forces.

5. The metal-air fuel cell battery system of claim 4, wherein said motor is driven by a spring mechanism.

6. The metal-air fuel cell battery system of claim 1, wherein said movable cathode structure is cylindrically shaped and has a hollow center permitting air flow therethrough.

7. The metal-air fuel cell battery system of claim 1, wherein said ionically-conductive medium is an ionically-conductive belt structure transported between said movable cathode structure and at least a portion of said metal-fuel tape.

8. The metal-air fuel cell battery system of claim 1, wherein said movable cathode structure is a cathode belt structure.

9. The metal-air fuel cell battery system of claim 1, wherein said movable cathode structure is a cathode belt structure, and said ionically-conductive medium is an ionically-conductive belt structure disposed between at least a portion of said cathode belt structure and said metal-fuel tape.

10. The metal-air fuel cell battery system of claim 1, wherein only one of said movable cathode structure and said metal-fuel tape is actively transported relative to said housing during system operation.

11. The metal-air fuel cell battery system of claim 1, wherein said solid-state ionically-conductive medium comprises an ionically-conductive belt.

12. The metal-air fuel cell battery system of claim 11, wherein said ionically-conductive belt is made from an open-cell polymer material having a porous structure.

13. The metal-air fuel cell battery system of claim 11, wherein said ionically-conductive belt further comprises a solid-state film formed on a substrate material having a higher surface tension than the solid-state film.

14. The metal-air fuel cell battery system of claim 13, wherein said solid-state film is formed by: depositing a solution comprising liquid electrolyte and solvent on said substrate material, and evaporating the solvent.

15. The metal-air fuel cell battery system of claim 13, wherein said substrate material is polyvinyl alcohol (PVA).

16. A method of producing electrical power from a metal-air fuel cell battery system having a housing, a movable cathode structure, a supply of a metal-fuel tape, and an source of ionically-conductive medium for supporting ion transport between said movable cathode structure and said metal-fuel tape during system operation, said method comprising the steps of:
  (a) providing a solid-state ionically conductive medium transportable relative to both said movable cathode structure and said metal-fuel tape;
  (b) arranging said moving cathode structure and said supply of metal-fuel tape within said housing so that said ionically-conductive medium is disposed in physical contact with said movable cathode structure and said metal-fuel tape; and
  (c) while actively transporting at least one of said movable cathode structure, said metal-fuel tape and said ionically-conductive medium relative to said housing, applying a coating of water (H2O) and/or an electrolyte make-up solution from a dispenser in fluid communication with an applicator to the surface of said metal-fuel tape and/or said ionically-conductive medium during system operation so that, during system operation, wetting occurs between (i) said ionically-conductive medium and said metal-fuel tape, and (ii) said ionically-conductive medium and said movable cathode structure, thereby maintaining a sufficient level of surface tension between said ionically-conductive medium and the metal-fuel tape and said ionically-conductive medium and said movable cathode structure during system operation causing said metal-fuel tape, said ionically-conductive medium and said movable cathode structure to move at substantially the same velocity at points of contact therebetween by hydrostatic forces created by said maintained level of surface tension.

17. The method of claim 16, wherein said movable cathode structure is cylindrically shaped and has a hollow center permitting air flow therethrough.

18. The method of claim 16, wherein said movable cathode structure is a cathode belt structure.

19. The method of claim 16, wherein said movable cathode structure is a cathode belt structure, and said ionically-conductive medium is an ionically-conductive belt structure disposed between at least a portion of said cathode belt structure and said metal-fuel tape.

20. The method of claim 16, where during step (a) only one of said movable cathode structure and said metal-fuel tape is actively transported relative to said housing during system operation.

21. The method of claim 16, wherein said solid-state ionically-conductive medium comprises an ionically-conductive belt.

22. The method of claim 21, wherein said ionically-conductive belt is made from an open-cell polymer material having a porous structure.

23. The method of claim 21, wherein said ionically-conductive belt further comprises a solid-state film formed on a substrate material having a higher surface tension than the solid-state film.

24. The method of claim 23, wherein said solid-state film is formed by: depositing a solution comprising liquid electrolyte and solvent on said substrate material, and evaporating the solvent.

25. The method of claim 23, wherein said substrate material is polyvinyl alcohol (PVA).

* * * * *